(12) United States Patent
Qiu

(10) Patent No.: US 12,473,719 B2
(45) Date of Patent: Nov. 18, 2025

(54) FLUID CHANNEL STRUCTURE AND TAP

(71) Applicant: Chunhe Qiu, Zhejiang (CN)

(72) Inventor: Chunhe Qiu, Zhejiang (CN)

( * ) Notice: Subject to any disclaimer, the term of this patent is extended or adjusted under 35 U.S.C. 154(b) by 154 days.

(21) Appl. No.: 18/174,678

(22) Filed: Feb. 27, 2023

(65) Prior Publication Data

US 2023/0220655 A1 Jul. 13, 2023

Related U.S. Application Data

(63) Continuation-in-part of application No. 17/585,472, filed on Jan. 26, 2022, now Pat. No. 11,614,174, which is a continuation-in-part of application No. 17/567,178, filed on Jan. 3, 2022, now abandoned, which is a continuation-in-part of application No. 17/225,114, filed on Apr. 8, 2021, now Pat. No. 11,215,289.

(51) Int. Cl.
*E03C 1/04* (2006.01)
*F16K 27/04* (2006.01)
*E03C 1/02* (2006.01)
*F16K 11/078* (2006.01)

(52) U.S. Cl.
CPC .............. *E03C 1/0403* (2013.01); *E03C 1/04* (2013.01); *F16K 27/045* (2013.01); *E03C 2001/026* (2013.01); *F16K 11/0787* (2013.01)

(58) Field of Classification Search
CPC .... E03C 1/0403; E03C 2001/026; E03C 1/04; F16K 27/045; F16K 11/0787
See application file for complete search history.

(56) References Cited

U.S. PATENT DOCUMENTS

| | | | | |
|---|---|---|---|---|
| 6,154,897 A | * | 12/2000 | Paini | E03C 1/04 |
| | | | | 4/677 |
| 6,757,921 B2 | * | 7/2004 | Esche | E03C 1/04 |
| | | | | 4/677 |
| 7,533,683 B2 | * | 5/2009 | Ortega | F16K 19/006 |
| | | | | 137/454.6 |
| 8,240,326 B2 | * | 8/2012 | Kacik | F16K 19/006 |
| | | | | 137/315.12 |
| 8,453,669 B2 | * | 6/2013 | Veros | F16K 11/06 |
| | | | | 4/677 |
| 8,584,697 B2 | * | 11/2013 | Hsu | E03C 1/04 |
| | | | | 4/677 |
| 9,334,634 B2 | * | 5/2016 | Bares | F16L 37/00 |
| 10,184,232 B2 | * | 1/2019 | Veros | E03C 1/0404 |
| 10,234,049 B1 | * | 3/2019 | He | F16K 31/605 |

(Continued)

*Primary Examiner* — Craig M Schneider
*Assistant Examiner* — Christopher D Ballman

(57) ABSTRACT

A fluid channel structure and a tap are provided. The tap includes a protective housing having a first receiving cavity and a bracket, the bracket defines a via hole communicated with the first receiving cavity. The fluid channel structure includes a base received in the first receiving cavity and mounted on the bracket, a first extension pipe, a second extension pipe and a third extension pipe, the first extension pipe, the second extension pipe and the third extension pipe approximately extend along an axial direction of the protective housing, one end of each of the first extension pipe, the second extension pipe and the third extension pipe is connected with the base, another end of each of the first extension pipe, the second extension pipe and the third extension pipe includes a threaded portion.

19 Claims, 29 Drawing Sheets

(56) References Cited

U.S. PATENT DOCUMENTS

| | | | |
|---|---|---|---|
| 10,738,899 B2* | 8/2020 | Chang | E03C 1/025 |
| 10,754,363 B2* | 8/2020 | Fassolette | G05D 23/134 |
| 10,935,157 B2* | 3/2021 | Du | F16K 31/602 |
| 11,111,656 B2* | 9/2021 | Peng | E03C 1/0412 |
| 11,274,761 B2* | 3/2022 | Erickson | E03C 1/0404 |
| 11,505,927 B2* | 11/2022 | Lu | E03C 1/0404 |
| 11,591,779 B2* | 2/2023 | Currey | E03C 1/0404 |
| 11,649,619 B2* | 5/2023 | Awada | C02F 1/003 |
| | | | 210/446 |
| 11,821,183 B2* | 11/2023 | Chen | E03C 1/0401 |
| 2017/0101765 A1* | 4/2017 | Song | E03C 1/0402 |
| 2019/0085993 A1* | 3/2019 | Nelson | F16K 19/006 |

* cited by examiner

FLUID CHANNEL STRUCTURE AND TAP

CROSS-REFERENCE TO RELATED APPLICATIONS

This application is a continuation-in-part of U.S. application Ser. No. 17/585,472, filed Jan. 26, 2022, which is a continuation-in-part of U.S. patent application Ser. No. 17/567,178 filed on Jan. 3, 2022, which is a continuation-in-part of U.S. patent application Ser. No. 17/225,114 filed on Apr. 8, 2021, now U.S. Pat. No. 11,215,289, issued on Jan. 4, 2022. The contents of the above-identified application are incorporated herein by reference.

FIELD

The present disclosure relates to taps, and, more particularly, to a fluid channel structure, and a tap having the fluid channel structure.

BACKGROUND

The tap normally includes a base which can be connected with the hot water supply, the cold water supply and the outlet pipe to supply hot water, cold water or mixed water. Trouble is, user should insert the hot water supply, the cold water supply and the outlet pipe into the tap and then connect them with the base. Moreover, when user needs to separate the hot water supply, the cold water supply and the outlet pipe from the base, user can only disassemble them in the tap. Thus, there is need of such tap which may be easy to assemble and disassemble.

SUMMARY

The present disclosure provides a fluid channel structure applied to a tap. The tap includes a protective housing having a first receiving cavity and a bracket, the bracket defines a via hole communicated with the first receiving cavity. The fluid channel structure includes a base received in the first receiving cavity and mounted on the bracket, a first extension pipe, a second extension pipe and a third extension pipe, the first extension pipe, the second extension pipe and the third extension pipe approximately extend along an axial direction of the protective housing, one end of each of the first extension pipe, the second extension pipe and the third extension pipe is connected with the base, another end of each of the first extension pipe, the second extension pipe and the third extension pipe includes a threaded portion.

The present disclosure further provides a tap which includes a valve core assembly, the valve core assembly includes the fluid channel structure and a valve structure connected with the fluid channel structure and configured to open and close the fluid channel structure.

The present disclosure further provides a tap which includes a protective housing, a valve structure and a fluid channel structure, the protective housing includes a receiving cavity and a bracket, the bracket defines a via hole communicated with the receiving cavity. The bracket mounts the fluid channel structure and the valve structure in the receiving cavity. The fluid channel structure includes a base and a connecting member. The base defines at least three first openings and at least three second openings, each of the at least three first openings is communicated to one corresponding second opening to form a first inlet channel, a second inlet channel and an outlet channel. The connecting member defines at least three through holes, the at least three through holes are in one-to-one correspondence with the at least three first openings and communicated to corresponding second openings.

BRIEF DESCRIPTION OF THE DRAWINGS

The advantages and features of the present disclosure will become better understood with reference to the following detailed description taken in conjunction with the accompanying drawing, in which.

Like reference numerals referring to like parts throughout the description of several views of the drawing.

DETAILED DESCRIPTION

Figure 1:
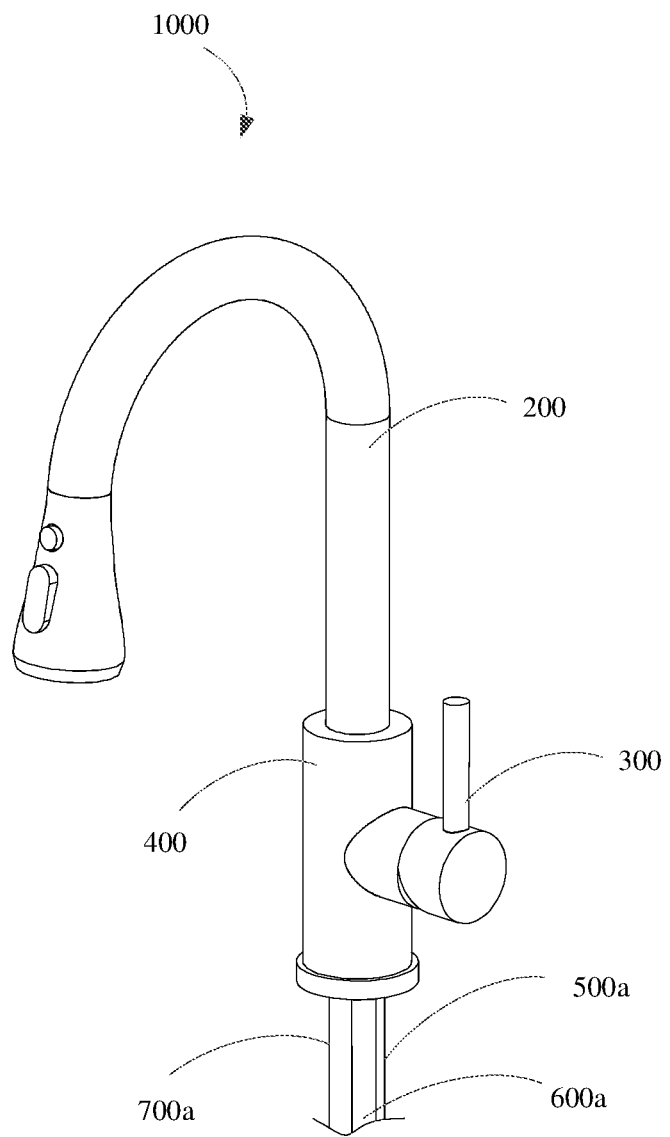
FIG. 1 is a structural diagram of a tap according to an embodiment of the present disclosure.
Figure 2:
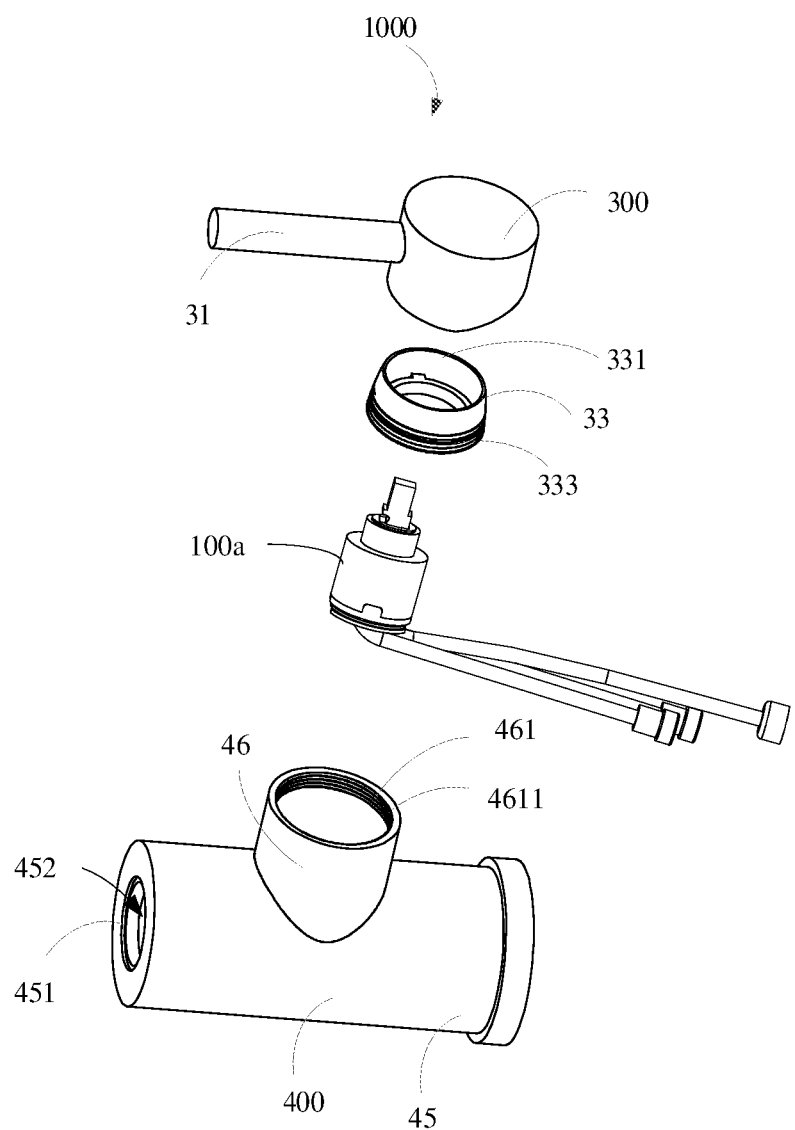
FIG. 2 is an exploded view of a part of the tap shown in FIG. 1.
Figure 3:
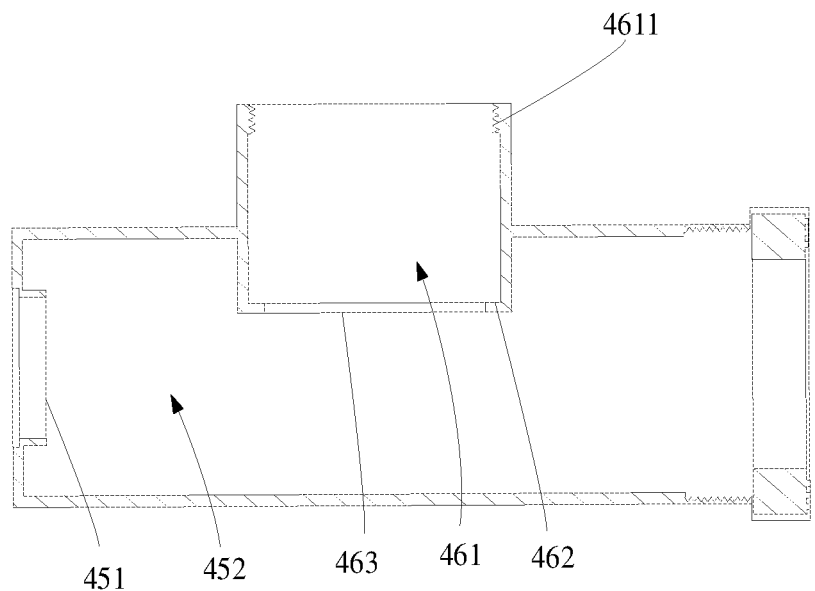
FIG. 3 is a cross sectional view of a protective housing of the tap shown in FIG. 1.
Figure 4:
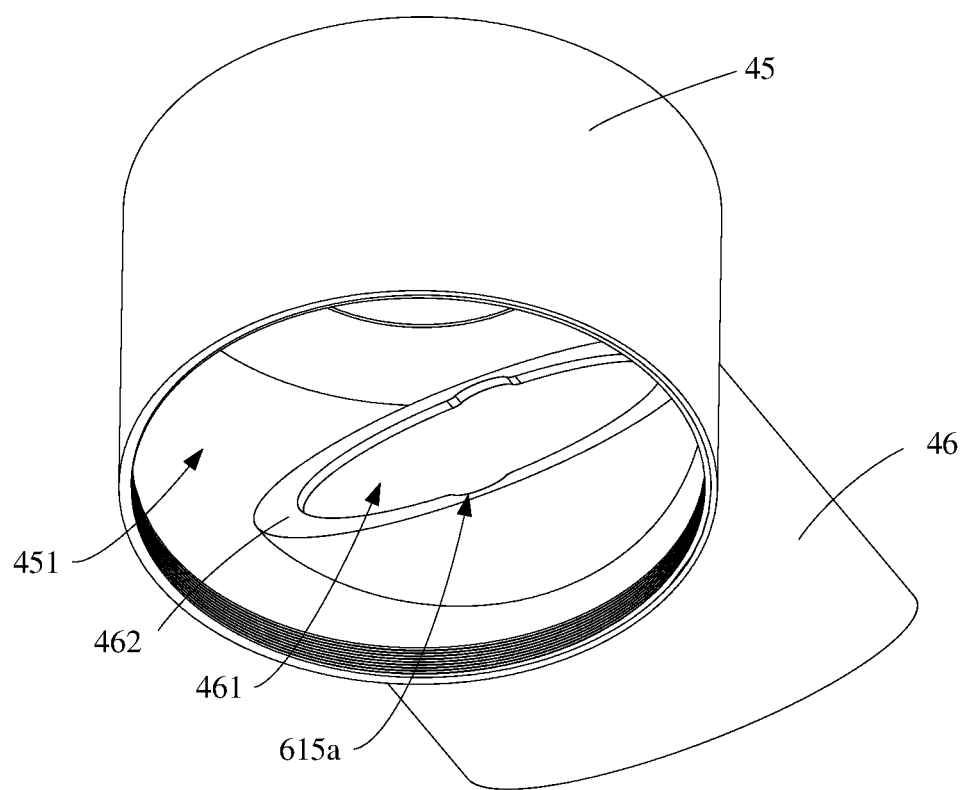
FIG. 4 is a structural diagram of the protective housing of the tap shown in FIG. 1.
Figure 5:
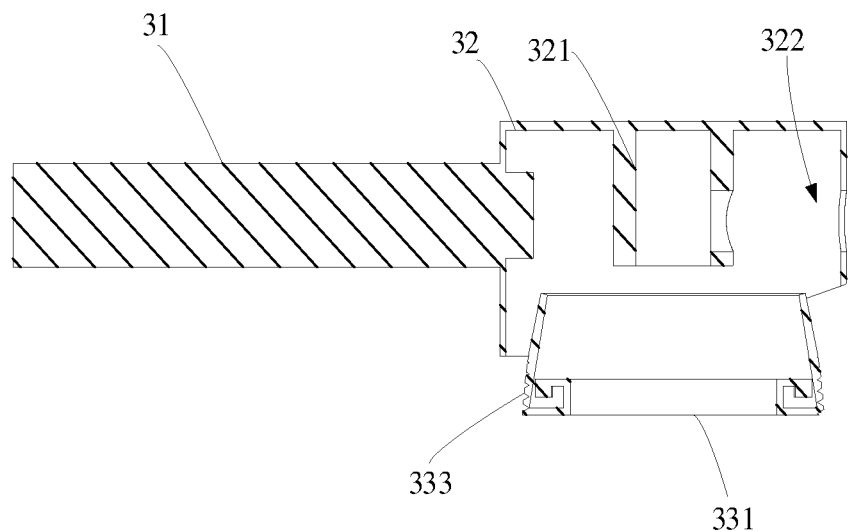
FIG. 5 is a cross sectional view of a handle assembly of the tap shown in FIG. 1.
Figure 6:
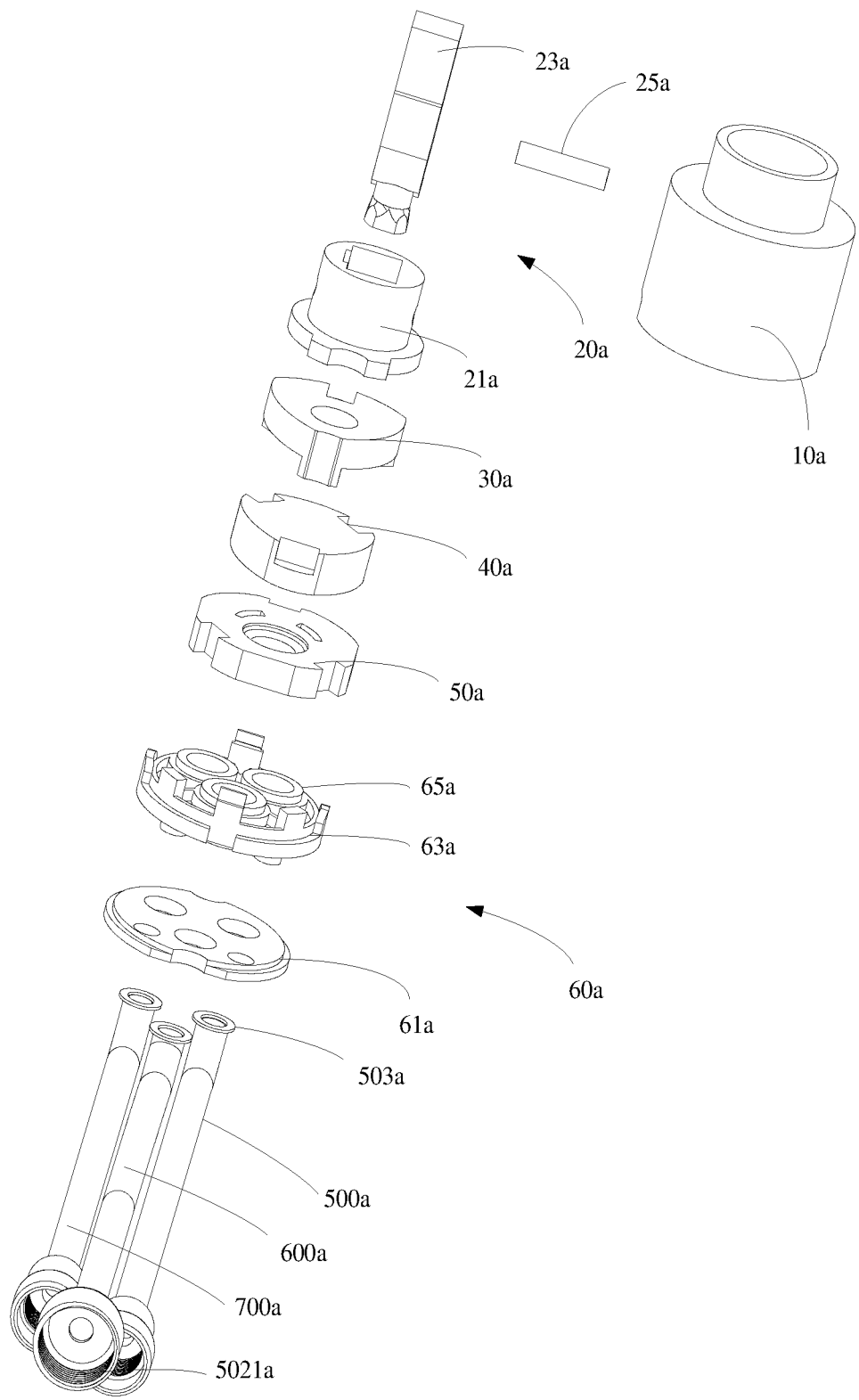
FIG. 6 is an exploded view of a valve core assembly of the tap shown in FIG. 1.
Figure 7:
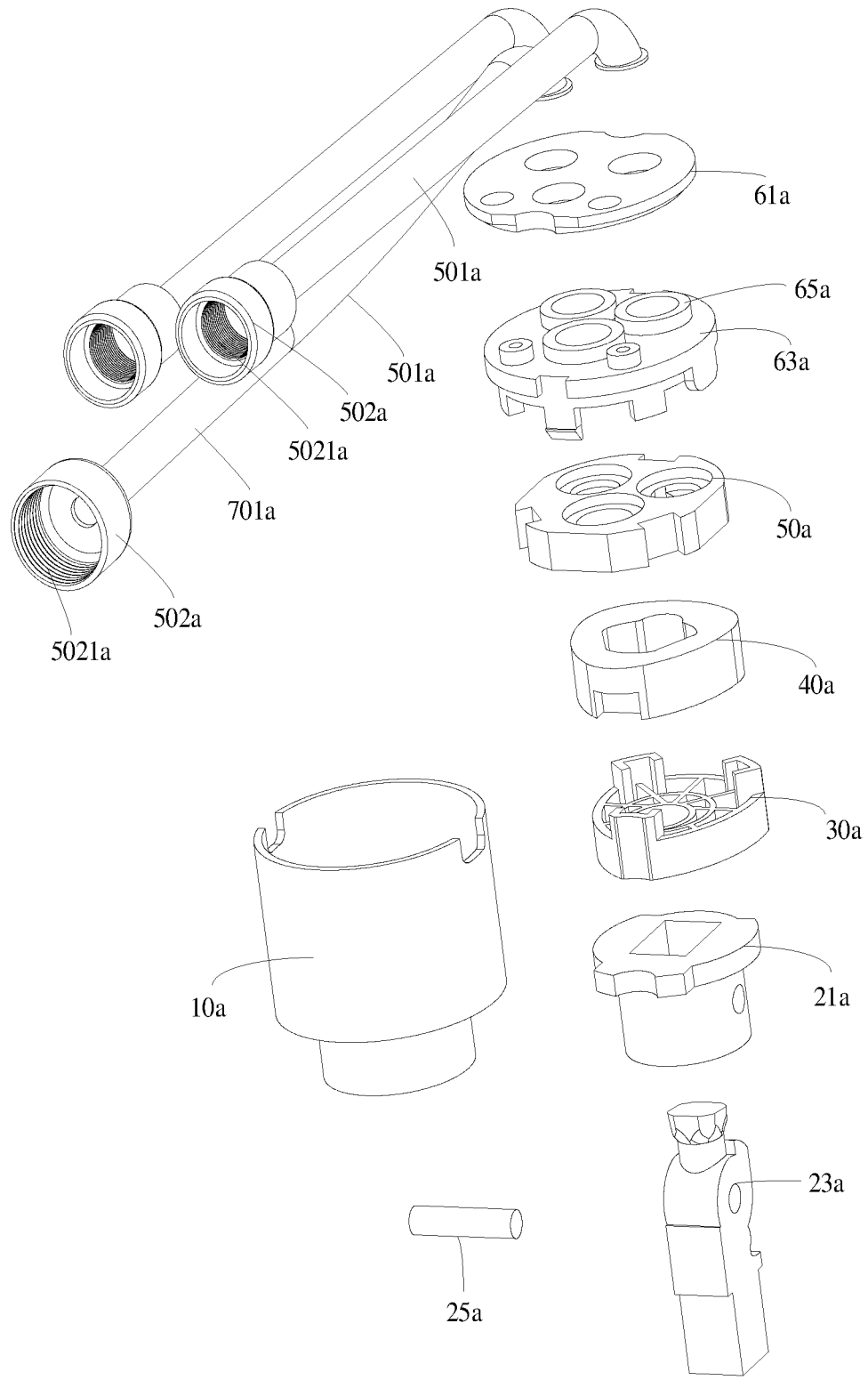
FIG. 7 is another exploded view of the valve core assembly of the tap shown in FIG. 1.
Figure 8:
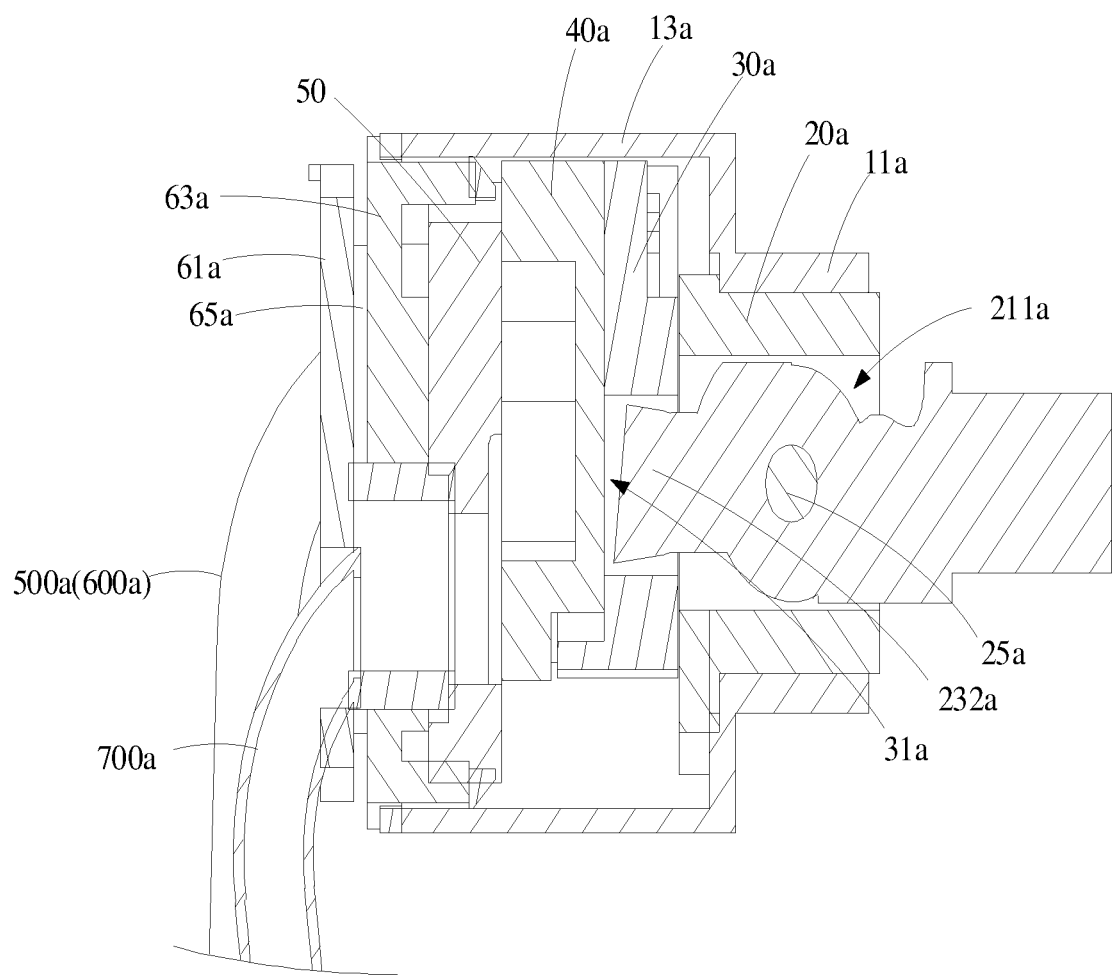
FIG. 8 is a cross sectional view of the valve core assembly of the tap shown in FIG. 1.
Figure 9:
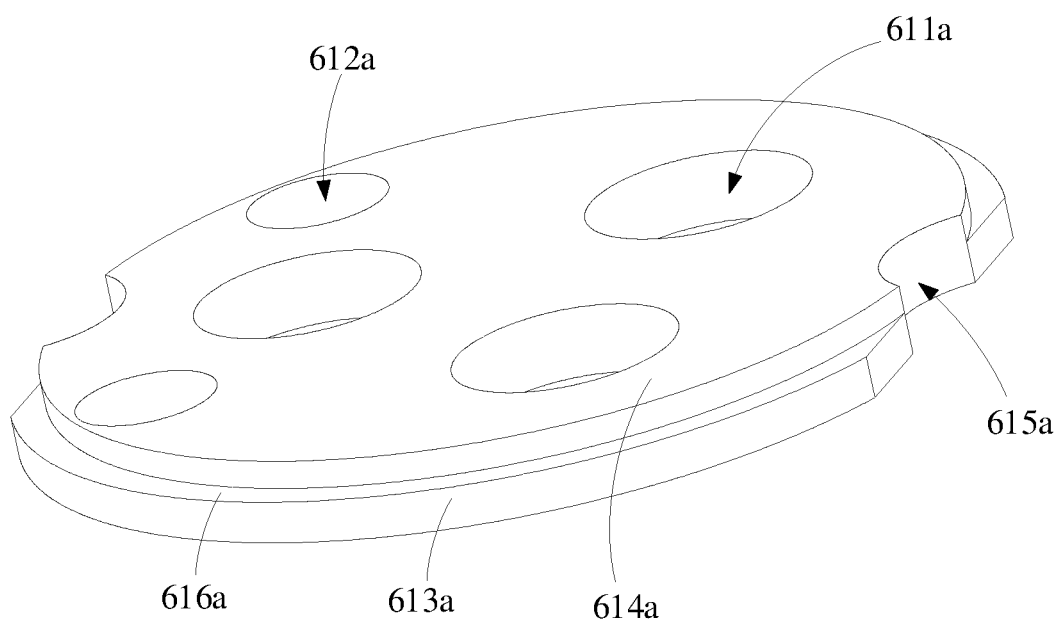
FIG. 9 is a structural diagram of a base of the valve core assembly shown in FIG. 6.
Figure 10:
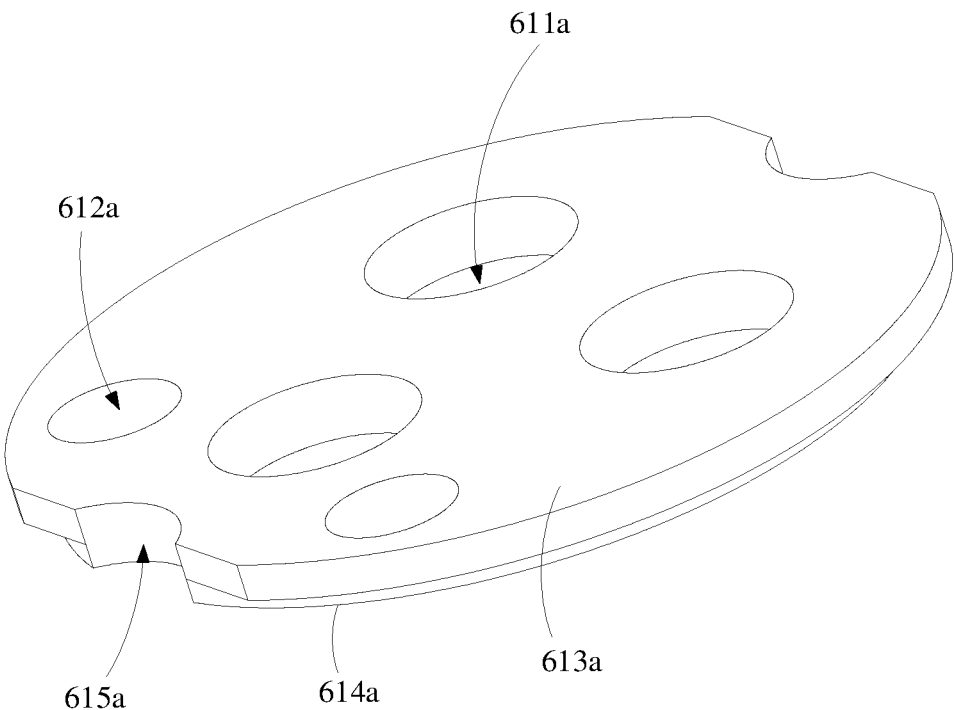
FIG. 10 is another structural diagram of the base of the valve core assembly shown in FIG. 6.
Figure 11:
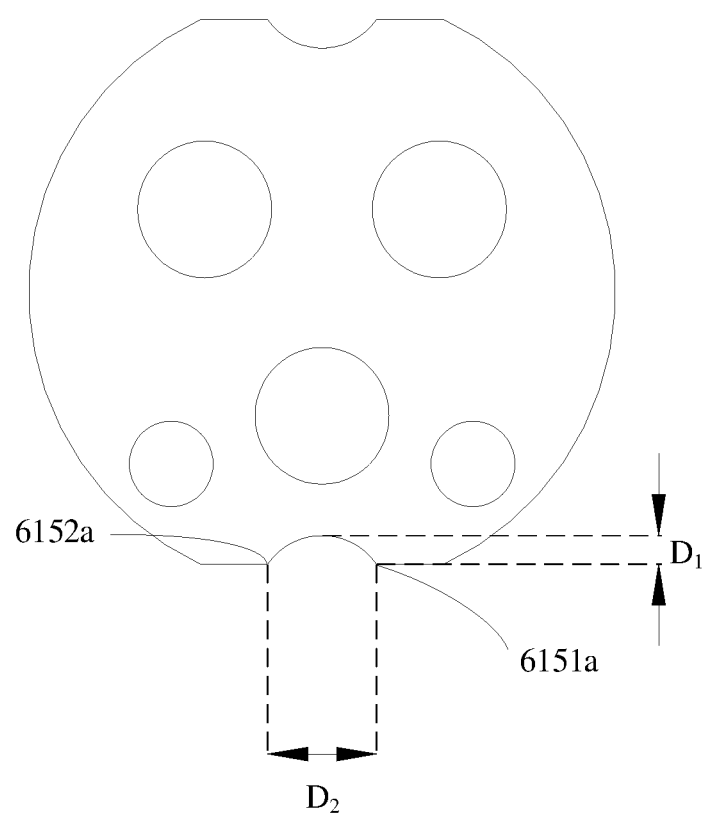
FIG. 11 is a further structural diagram of the base of the valve core assembly shown in FIG. 6.
Figure 12:
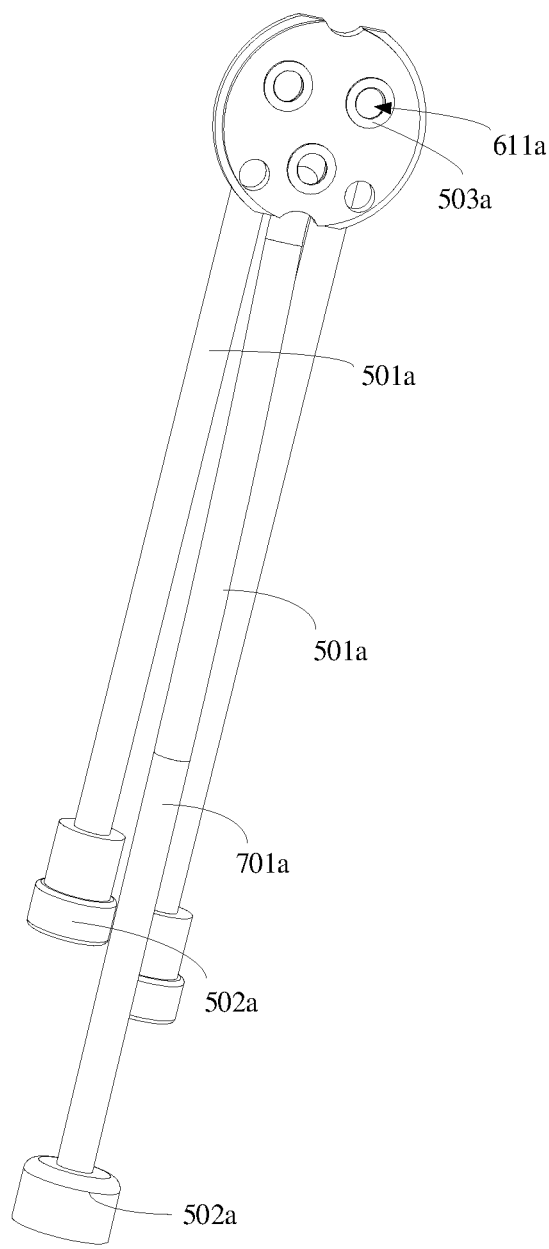
FIG. 12 is a structural diagram of a part of the valve core assembly shown in FIG. 6.
Figure 13:
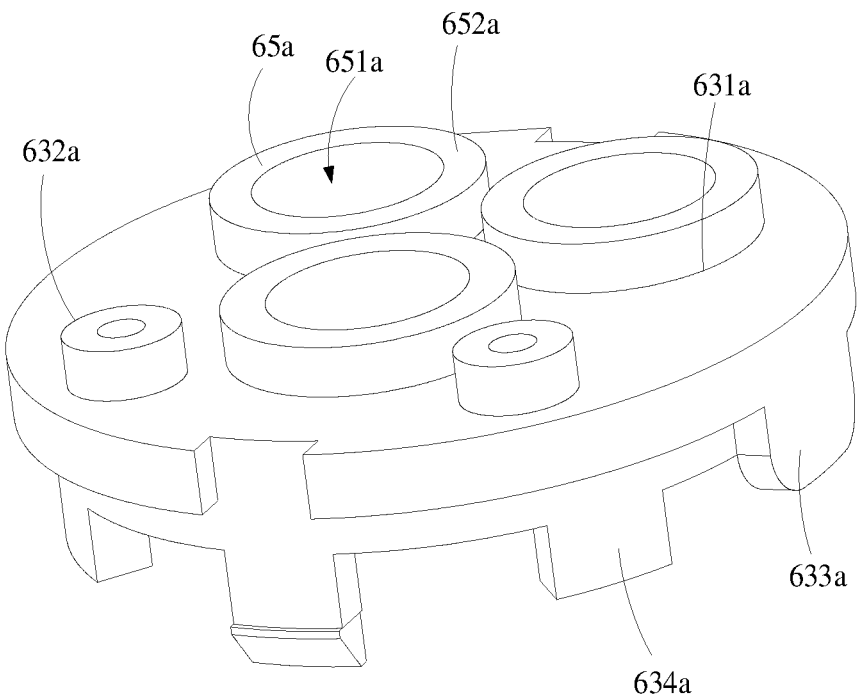
FIG. 13 is a structural diagram of a connecting member and a sealing member of the valve core assembly shown in FIG. 6.
Figure 14:
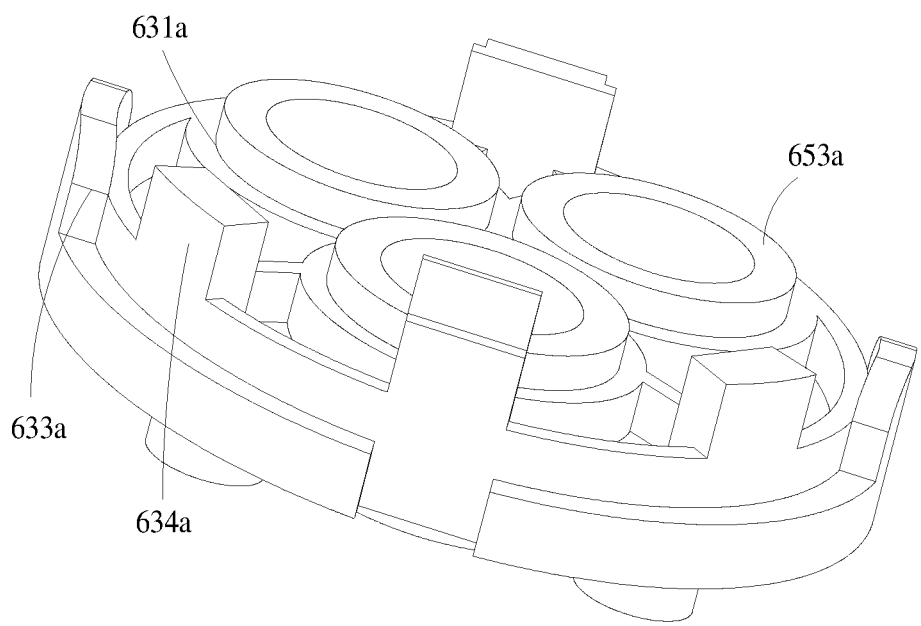
FIG. 14 is another structural diagram of the connecting member and the sealing member of the valve core assembly shown in FIG. 6.
Figure 15:
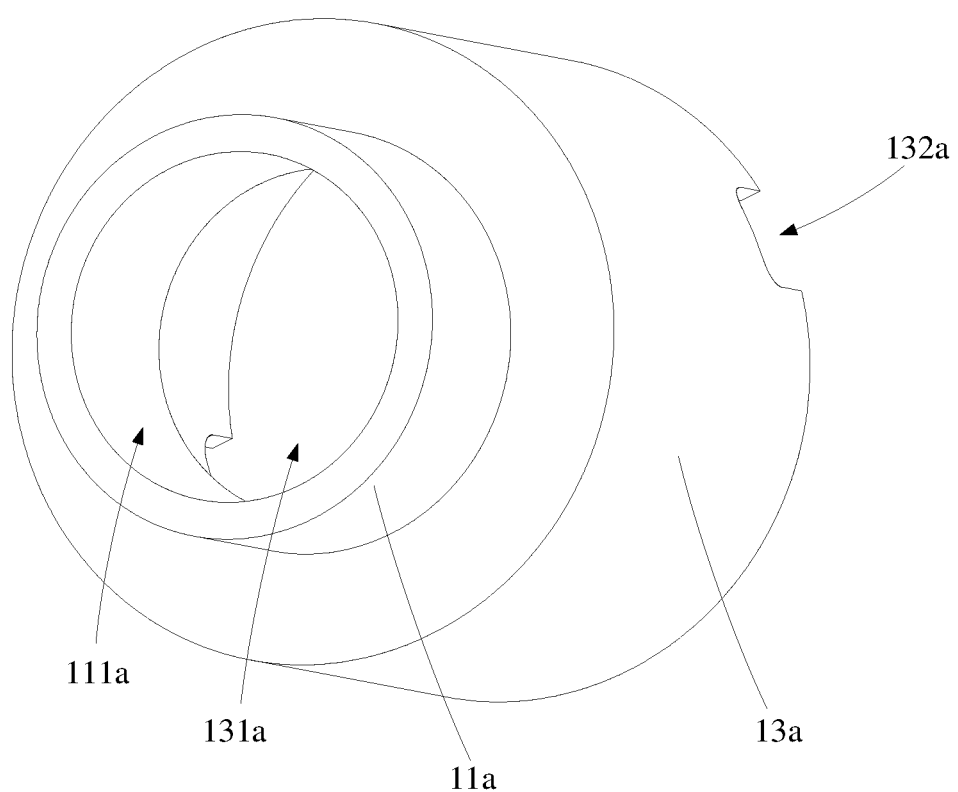
FIG. 15 is a structural diagram of a valve housing of the valve core assembly shown in FIG. 6.
Figure 16:
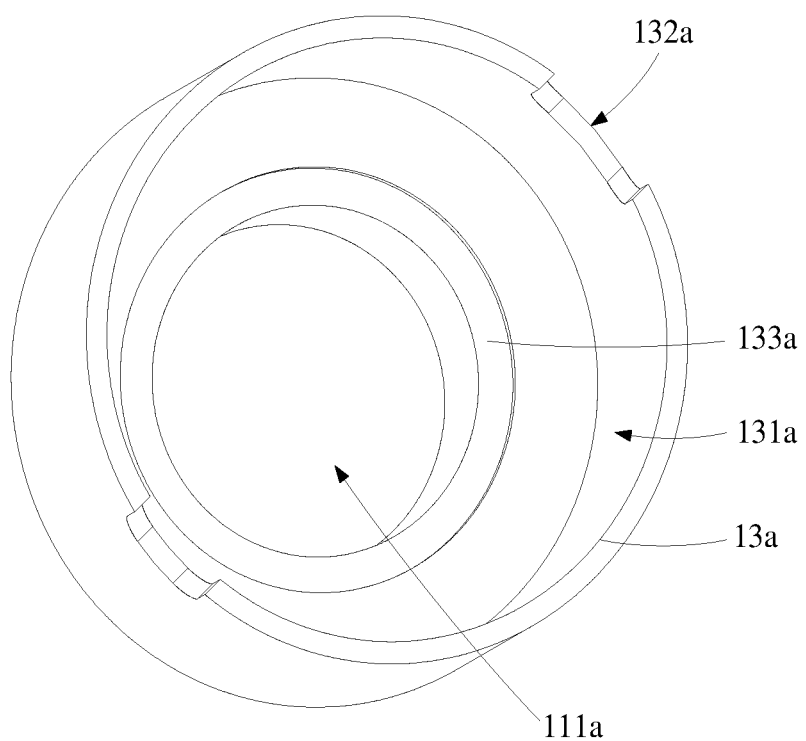
FIG. 16 is another structural diagram of the valve housing of the valve core assembly shown in FIG. 6.
Figure 17:
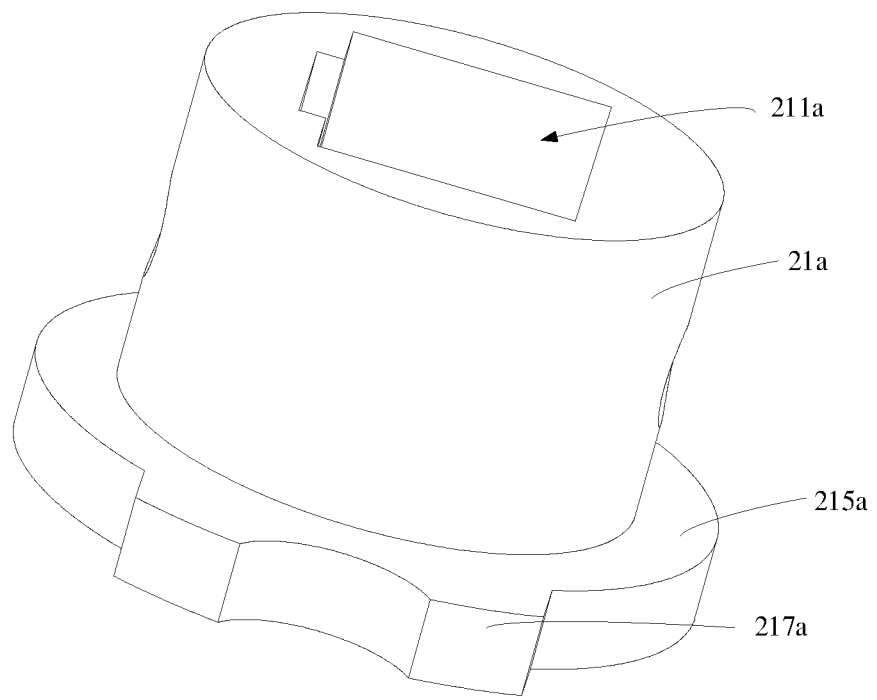
FIG. 17 is a structural diagram of a sleeve of the valve core assembly shown in FIG. 6.
Figure 18:
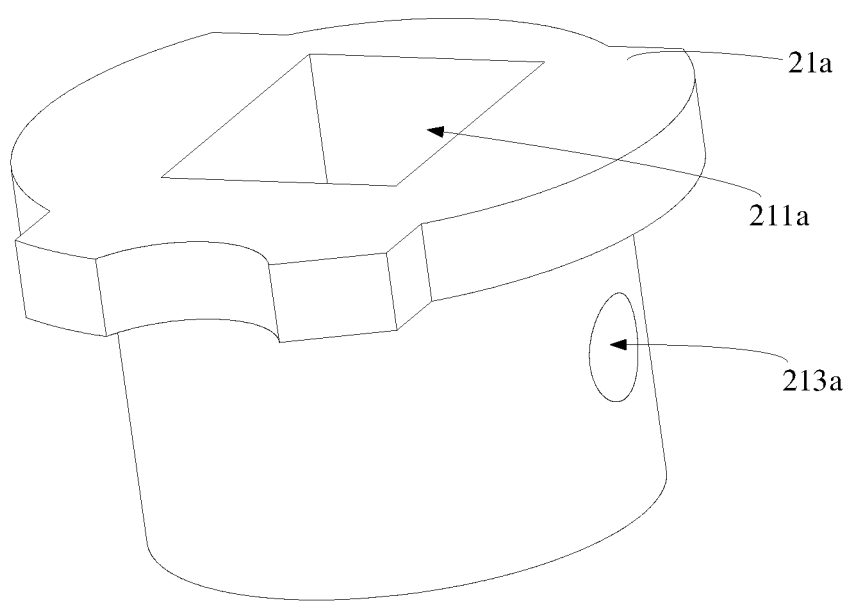
FIG. 18 is another structural diagram of the sleeve of the valve core assembly shown in FIG. 6.
Figure 19:
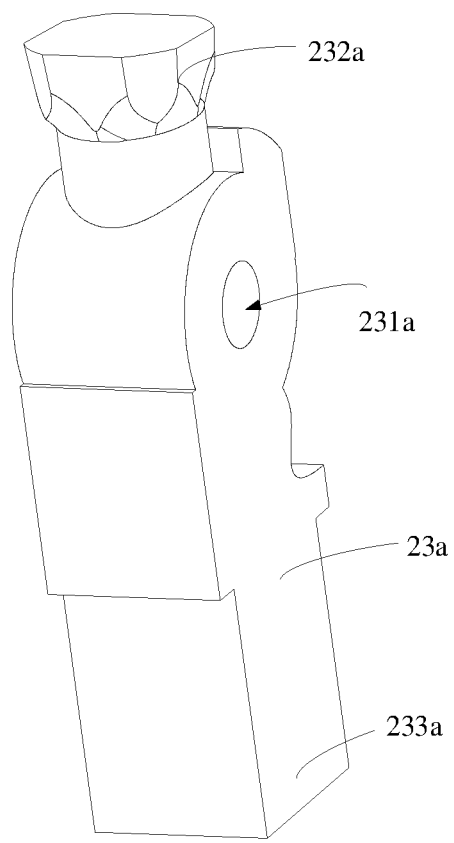
FIG. 19 is a structural diagram of an actuator of the valve core assembly shown in FIG. 6.
Figure 20:
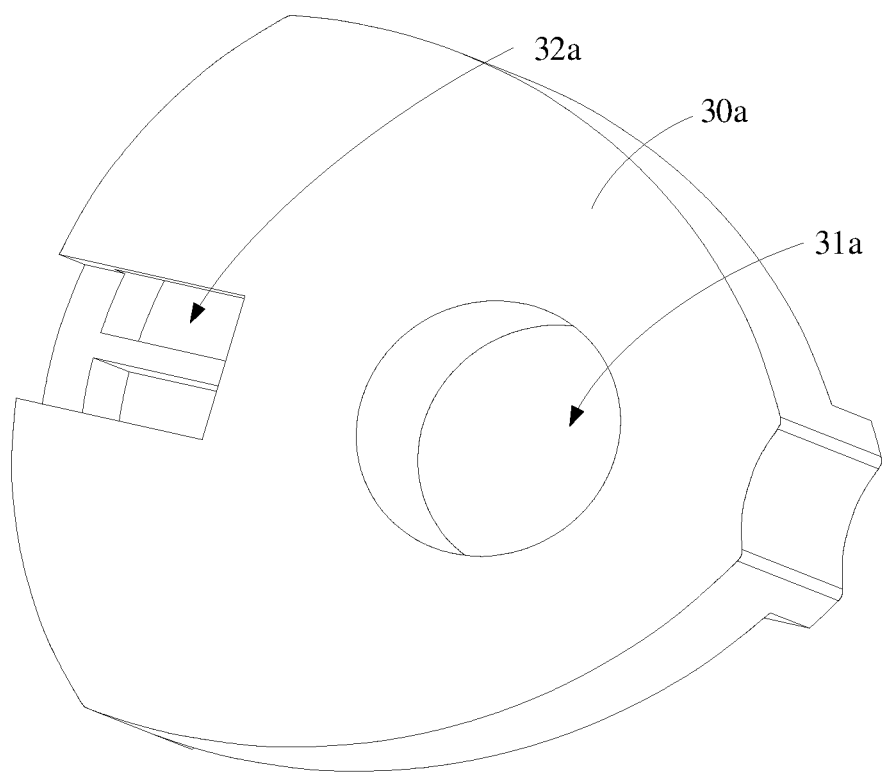
FIG. 20 is a structural diagram of a control plate of the valve core assembly shown in FIG. 6.
Figure 21:
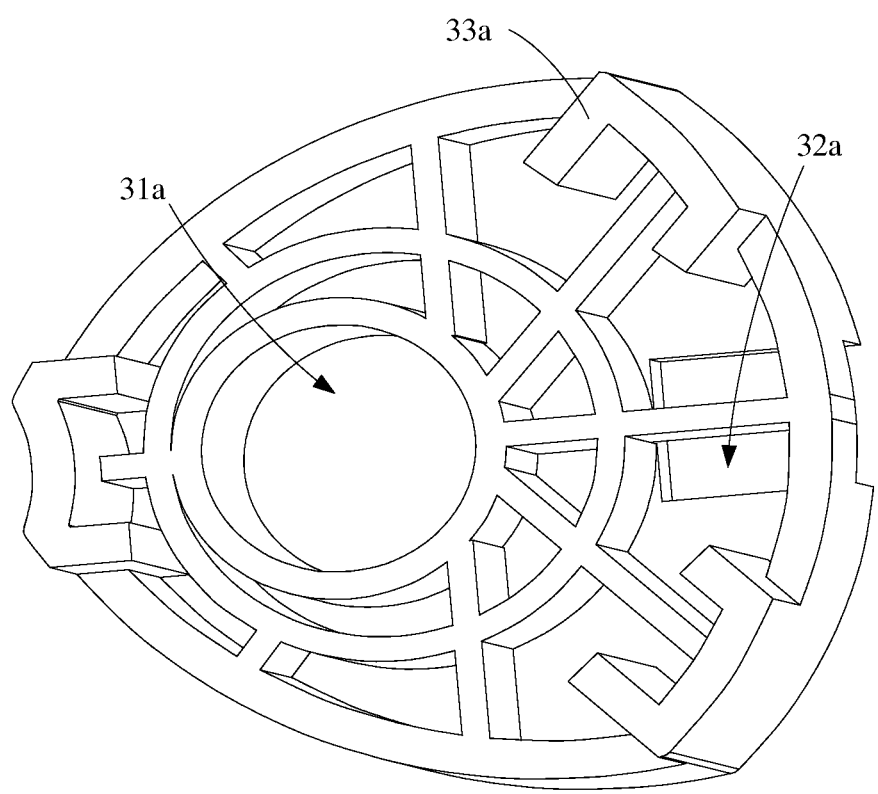
FIG. 21 is another structural diagram of the control plate of the valve core assembly shown in FIG. 6.
Figure 22:
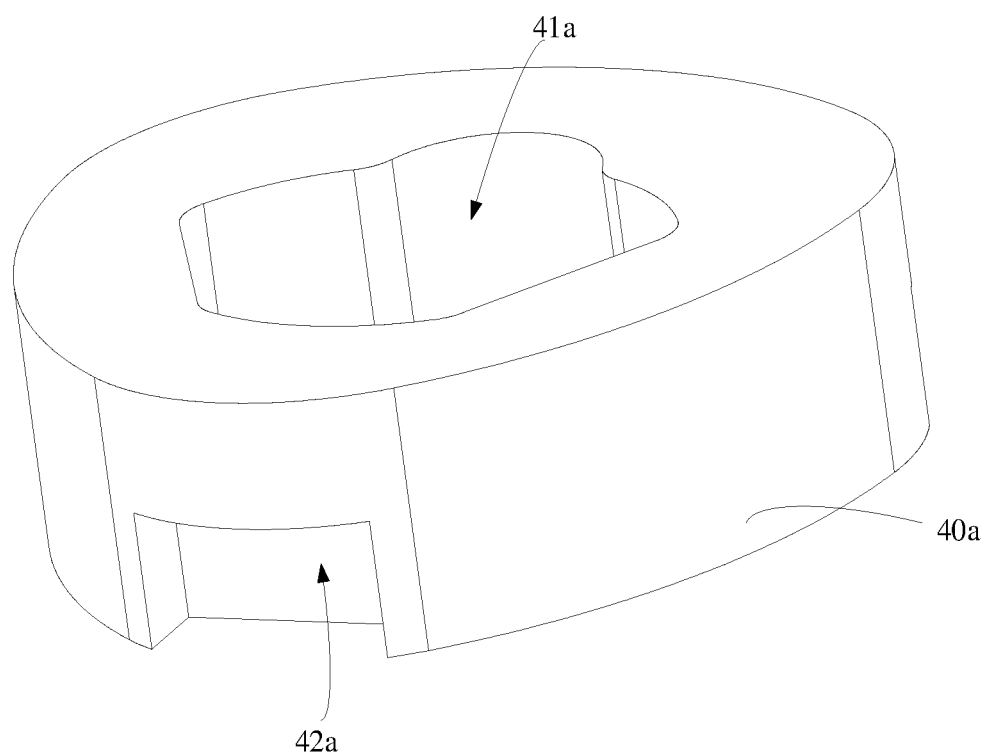
FIG. 22 is a structural diagram of a moving plate of the valve core assembly shown in FIG. 6.
Figure 23:
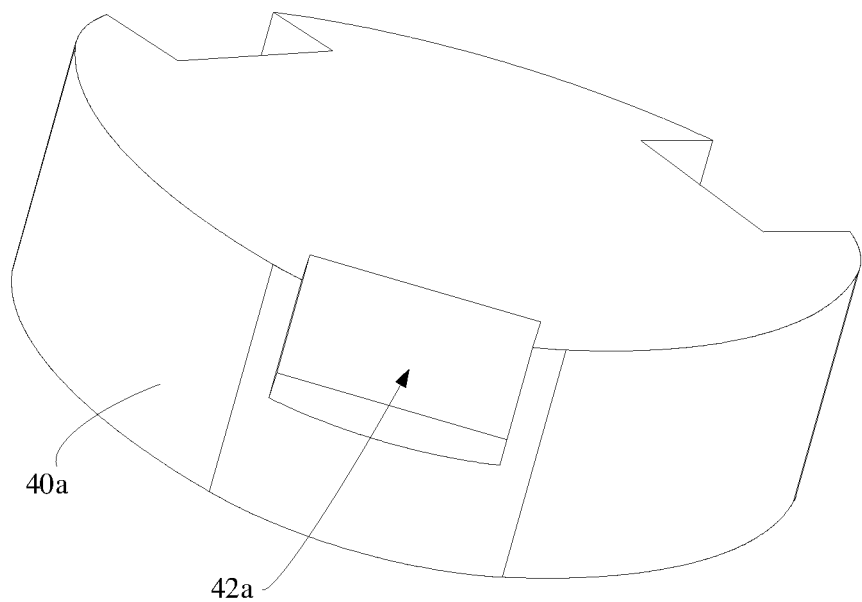
FIG. 23 is another structural diagram of the moving plate of the valve core assembly shown in FIG. 6.
Figure 24:
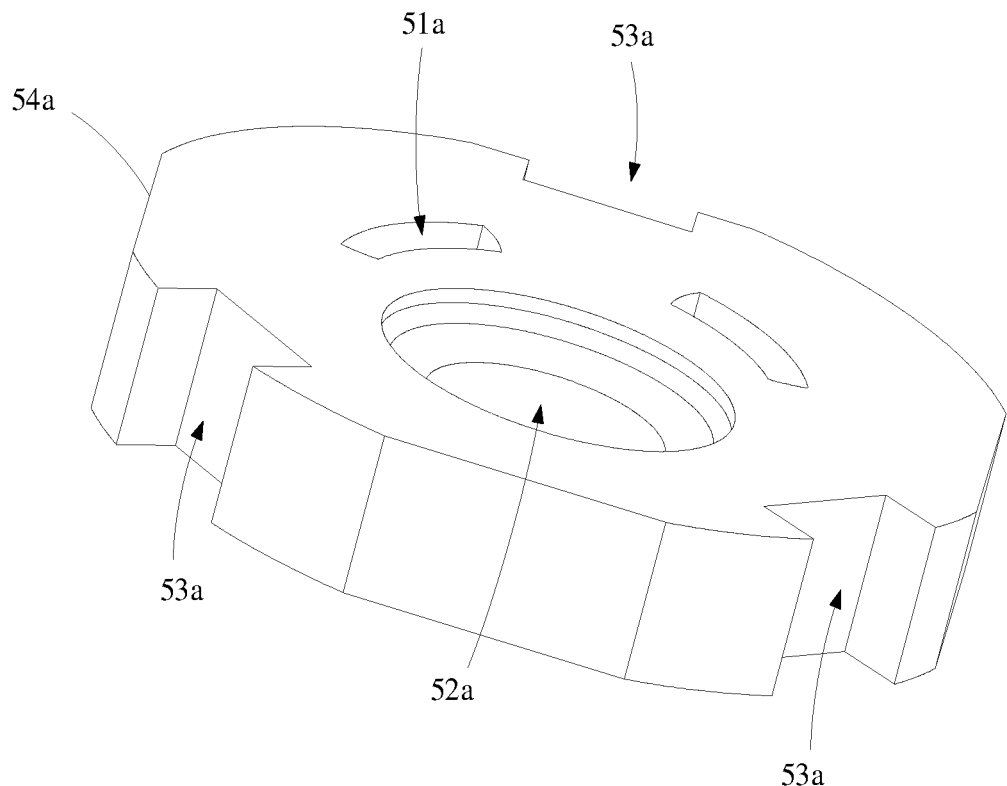
FIG. 24 is a structural diagram of a static plate of the valve core assembly shown in FIG. 6.
Figure 25:
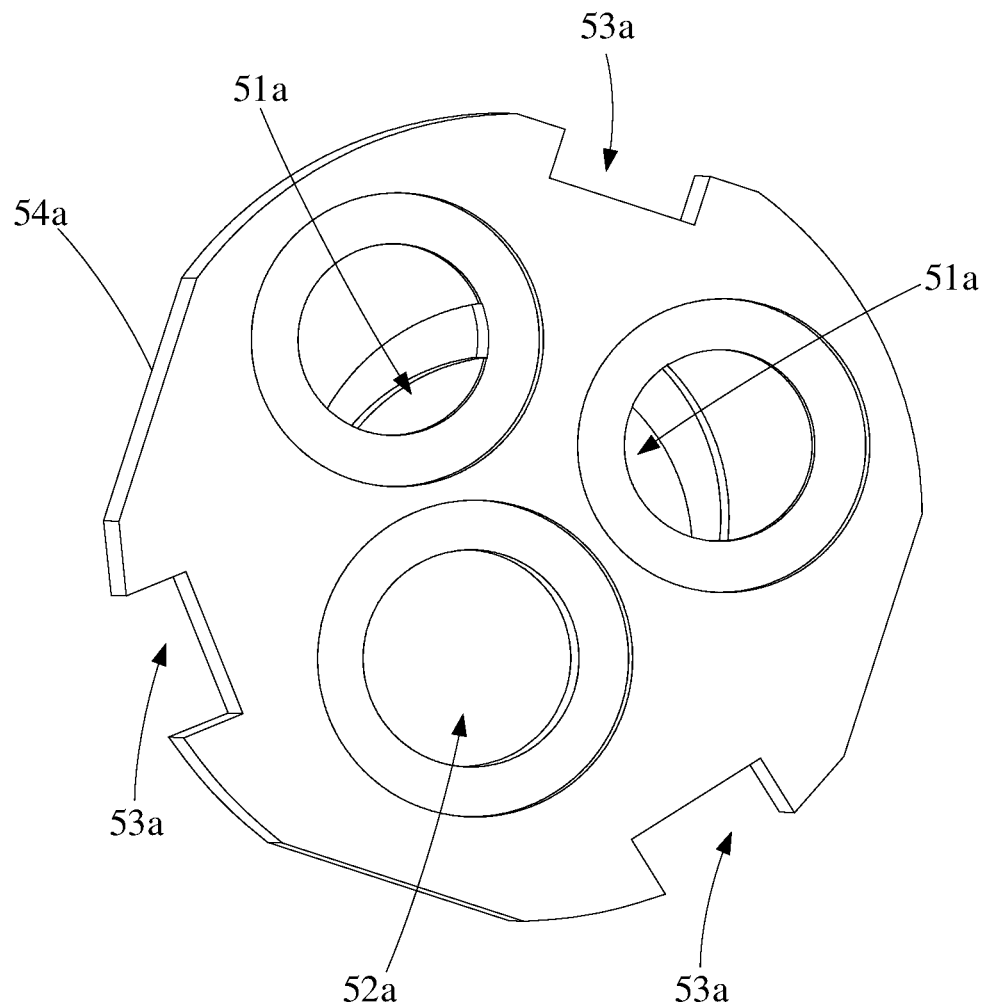
FIG. 25 is another structural diagram of the static plate of the valve core assembly shown in FIG. 6.

The exemplary embodiments described herein detail for illustrative purposes are subject to many variations in implementation. The present disclosure provides a valve core assembly. It should be emphasized, however, that the present disclosure is not limited only to what is disclosed and extends to cover various alternation to valve core assembly. It is understood that various omissions and substitutions of equivalents are contemplated as circumstances may suggest or render expedient, but these are intended to cover the application or implementation without departing from the spirit or scope of the present disclosure.

The terms "a" and "an" herein do not denote a limitation of quantity, but rather denote the presence of at least one of the referenced items.

The terms "having", "comprising", "including", and variations thereof signify the presence of a component.

Please referring to FIGS. 1-5, the present disclosure provides a tap 1000 which may be a pull-out tap or a non pull-out tap. The tap 1000 includes a valve core assembly 100a, a hollow conduit 200 communicated with the valve core assembly 100a, a handle assembly 300 horizontally or obliquely connected to the hollow conduit 200, and a protective housing 400 configured to accommodate the valve core assembly 100a. The handle assembly 300 may be actuated or rotated up-and-down or left-and-right to open and close the valve core assembly 100a. The hollow conduit 200 is arranged with an outlet pipe 201 accommodated with the valve core assembly 100a, and the water passing through the valve core assembly 100a can flow out the tap 1000 by the outlet pipe 201. The outlet pipe 201 is preferred to be flexible, and may be a plastic pipe, a braided pipe, or a metal pipe.

Please referring to FIGS. 6-25, the fluid channel structure 60a according to a first embodiment of the present disclosure is applicable to the pull-out tap. The fluid channel structure 60a includes a base 61a, a connecting member 63a connected with the base 61a, at least three sealing members 65a, a first extension pipe 500a, a second extension pipe 600a, and a third extension pipe 700a. The base 61a defines at least three through holes 611a. The at least three through holes 611a are communicated with the first extension pipe 500a, the second extension pipe 600a and the third extension pipe 700a, respectively. The first extension pipe 500a, the second extension pipe 600a and the third extension pipe 700a approximately extend along an axial direction of the protective housing 400. The first extension pipe 500a is connected with a hot water supply, and the second extension pipe 600a is connected with a cold water supply. Free ends of the third extension pipe 700a, the first extension pipe 500a and the second extension pipe 600a all face downwards, that is, towards the ground. The connecting member 63a defines at least three through holes 631a communicated with their respective through holes 611a. Each sealing member 65a defines a through hole 651a. Each through hole 651a is communicated with the corresponding through hole 611a and the corresponding through holes 631a, to form a first inlet channel (not labeled), a second inlet channel (not labeled), and an outlet channel (not labeled); or each sealing member 65a is received in the corresponding through hole 631a, and each through hole 651a is communicated with the corresponding through hole 611a, to form the first inlet channel, the second inlet channel, and the outlet channel. Center lines of the first inlet channel, the second inlet channel and the outlet channel are substantially horizontally set, and the outlet channel is arranged between the first inlet channel and the second inlet channel.

Hot water and cold water can flow in the valve core assembly 100a by the first inlet channel and the second inlet channel respectively, and mix in the valve core assembly 100a. The mixed water can flow out of the tap 1000 after flowing through the corresponding through hole 651a, the corresponding through hole 631a, the corresponding through hole 611a, the third extension pipe 700a, and outlet pipe 201. That is, the mixed water can flow out of the tap 1000 after flowing through the outlet channel, the third extension pipe 700a, and the outlet pipe 201. It should be understood that the hot water from the first extension pipe 500a can also flow out of the tap 1000 after flowing through the outlet channel, the third extension pipe 700a, and the outlet pipe 201; and the cold water from the second extension pipe 600a can also flow out of the tap 1000 after flowing through the outlet channel, the third extension pipe 700a, and the outlet pipe 201.

Each through hole 611a has two openings on two sides of the base 61a respectively, and the two openings of the through hole 611a face towards a same direction or face towards two opposite directions respectively. In one embodiment, projections of the two openings on the connecting member 63a approximately overlap with each other.

Each sealing member 65a is accommodated in one corresponding through hole 631a. When the base 61a is connected with the connecting member 63a, the sealing member 65a is connected between the base 61a and the connecting member 63a to prevent a leakage. Each sealing member 65a includes a first end 652a and a second end 653a. A size of each through hole 651a is no smaller than that of the corresponding through hole 611a, so that each sealing member 65a surrounds the corresponding through hole 611a. The size of each through hole 651a is smaller than that of the corresponding through hole 631a, and each sealing member 65a is received in the corresponding through hole 631a; or a size of each through hole 651a is larger than that of the corresponding through hole 631a, and each sealing member 65a surrounds the corresponding through hole 611a and the corresponding through hole 631a. In one embodiment, the first end 652a of each sealing member 65a is arranged outside the corresponding through hole 631a and tightly pressed between the base 61a and the connecting member 63a to prevent the leakage between the base 61a and the connecting member 63a.

The base 61a may have a plate structure, and a thickness of the base 61a may be about 1-3 mm, for example, the thickness of the base 61a is 1 mm, 2 mm, or 3 mm.

A diameter of the first extension pipe 500a may be about 0.6-2 cm, for example, the diameter of the first extension pipe 500a is 0.6 cm, 1 cm, 1.5 cm, or 2 cm.

A length of the first extension pipe 500a may be about 10-30 cm, for example, the length of the first extension pipe 500a is 10 mm, 15 mm, 20 mm, 25 mm, or 30 mm.

A diameter of the second extension pipe 600a may be about 0.6-2 cm, for example, the diameter of the second extension pipe 600a is 0.6 cm, 1 cm, 1.5 cm, or 2 cm.

A length of the second extension pipe 600a may be about 10~30 cm, for example, the length of the second extension pipe 600a is 10 mm, 15 mm, 20 mm, 25 mm, or 30 mm.

A diameter of the third extension pipe 700a may be about 0.6-2 cm, for example, the diameter of the third extension pipe 700a is 0.6 cm, 1 cm, 1.5 cm, or 2 cm.

A length of the third extension pipe 700a may be about 15-40 cm, for example, the length of the third extension pipe 700a is 10 mm, 15 mm, 20 mm, 25 mm, 30 mm, 35 mm, or 40 mm.

One of the base 61a and the connecting member 63a defines a connecting hole 612a, and the other one is provided with a connecting column 632a, the connecting column 632a is received in the connecting hole 612a to connect the base 61a with the connecting member 63a. When the base 61a has the plate structure, the base 61a defines the connecting hole 612a, and the connecting member 63a is protruded with the connecting column 632a.

In one embodiment, the base 61a is integratedly formed with the connecting member 63a by injection molding. The base 61a and the connecting member 63a may be made of the same material or different materials, such as metal (including stainless steel, copper, and the like) or plastic (preferably rigid plastic).

The base 61a, the first extension pipe 500a, the second extension pipe 600a and the third extension pipe 700a may be integratedly formed with each other, and may also be made of the same material or different materials, such as metal (including stainless steel, copper, and the like) or plastic (preferably rigid plastic). In one embodiment, the base 61a, the first extension pipe 500a, the second extension pipe 600a, and the third extension pipe 700a are made of plastic (preferably rigid plastic) and formed by injection molding. In another embodiment, the base 61a, the first extension pipe 500a, the second extension pipe 600a and the third extension pipe 700a are made of metal (including stainless steel, copper, and the like), the base 61a, the first extension pipe 500a, the second extension pipe 600a and the third extension pipe 700a may be formed separately, and then welded together or threadedly connected together. In a further embodiment, the base 61a is made of plastic (preferably rigid plastic) and the first extension pipe 500a, the second extension pipe 600a and the third extension pipe 700a are made of metal (including stainless steel, copper, and the like), the base 61a may be threadedly connected with the first extension pipe 500a, the second extension pipe 600a and the third extension pipe 700a. In another embodiment, the base 61a is made of metal (including stainless steel, copper, and the like), and the first extension pipe 500a, the second extension pipe 600a and the third extension pipe 700a are made of plastic (preferably rigid plastic), the base 61a may be threadedly connected with the first extension pipe 500a, the second extension pipe 600a and the third extension pipe 700a.

Each of the first extension pipe 500a, the second extension pipe 600a and the third extension pipe 700a includes a first sub extension pipe 501a communicated with the through hole 611a, and a connecting part 502a connected with one end of the first sub extension pipe 501a. The first sub extension pipe 501a may be made of metal (including stainless steel, copper, and the like) or plastic (preferably rigid plastic). The third extension pipe 700a further includes a second sub extension pipe 701a connected with the first sub extension pipe 501a. The connecting part 502a of the third extension pipe 700a is connected with one end of the second sub extension pipe 701a away from the base 61a. The second sub extension pipe 701a may be made of metal (including stainless steel, copper, and the like) or plastic, and welded with or threadedly connected with the first sub extension pipe 501a, and the second sub extension pipe 701a is preferred to be a plastic flexible pipe. The connecting part 502a may be made of metal (including stainless steel, copper, and the like) or plastic (preferably rigid plastic), and welded with or threadedly connected with the second sub extension pipe 701a. A free end of each connecting part 502a is provided with a threaded portion 5021a, and the threaded portion 5021a may an internal thread or an external thread, preferably an internal thread. The first sub extension pipe 501a substantially extends along the axial direction of the protective housing 400, and the threaded portion 5021a extends out of the protective housing 400, so it is convenient to connect the hot water supply, the cold water supply and the outlet pipe 201 with the threaded portions 5021a, or separate the hot water supply, the cold water supply and the outlet pipe 201 from the threaded portions 5021a, and the tap 1000 using the fluid channel structure 60a in consequence may be assembled or disassembled conveniently. In another embodiment, the third extension pipe 700a has an integrated structure, a length of the third extension pipe 700a is greater than that of the first extension pipe 500a or the second extension pipe 600a. One end of each of the first extension pipe 500a, the second extension pipe 600a and the third extension pipe 700a is connected with the base 61a, and the other end of each of the first extension pipe 500a, the second extension pipe 600a and the third extension pipe 700a is provided with the threaded portion 5021a.

The base 61a is welded with the first extension pipe 500a, the second extension pipe 600a and the third extension pipe 700a, and three welding parts 503a are formed to tightly connect the base 61a with the first extension pipe 500a, the second extension pipe 600a and the third extension pipe 700a. The welding part 503a may be arranged in the through hole 611a, arranged on a first periphery of the through hole 611a facing the connecting member 63a, or arranged on a second periphery of the through hole 611a facing the connecting member 63a.

The valve core assembly 100a further includes a valve structure which is connected with the fluid channel structure 60a to open and close the fluid channel structure 60a. The valve structure includes a valve housing 10a, an actuator 20a, a control plate 30a, a moving plate 40a, and a static plate 50a.

The valve housing 10a includes a first end 11a and a second end 13a. The first end 11a defines a first cavity 111a, and the second end 13a defines a second cavity 131a. In one embodiment, the second cavity 131a includes a bigger circumference area than the first cavity 111a.

The fluid channel structure 60a may be detachably connected to the valve housing 10a by a connecting structure. The connecting structure includes at least one projection 633a and at least one fixing groove 132a. The projection 633a is detachably received in the fixing groove 132a. In one embodiment, the surface of the connecting member 63a away from the base 61a includes the at least one projection 633a, the side surface of the valve housing 10a defines the at least one fixing groove 132a, and the at least one projection 633a is detachably received in the at least one fixing groove 132a, to detachably connect the valve housing 10a with the base 61a. In one embodiment, the side surface of the second end 13a defines the at least one fixing groove 132a.

Specifically, the at least one projection 633a includes a plurality of projections 633a, which are arranged along the periphery of the connecting member 63a and extended away from the base 61a. The at least one fixing groove 132a includes a plurality of fixing grooves 132a, which are arranged along the side surface of the valve housing 10a. Preferably, the side surface of the second end 13a defines the fixing grooves 132a.

The bottom wall of the second end 13a defines a support groove 133a, the support groove 133a is homocentric with the second cavity 131a. The first cavity 111a is communicated with the second cavity 131a, in detail, the bottom wall shared by the second end 13a and the first end 11a defines a through hole (not marked) for communicating the first cavity 111a with the second cavity 131a, and the support groove 133a is also communicated with the through hole.

The actuator 20a is rotatably arranged in the valve housing 10a. The actuator 20a includes a sleeve 21a, an actuating rod 23a, a positioning hole 213a, a positioning hole 231a and a positioning part 25a. The sleeve 21a includes a sleeve cavity 211a and a flange 215a. The sleeve 21a is rotatably arranged in the first cavity 111a. The actuating rod 23a is arranged in the sleeve cavity 211a. The positioning holes 213a and 231a are defined in the side surfaces of the sleeve 21a and the actuating rod 23a, respectively. The positioning hole 213a and the positioning hole 231a are collinearly aligned when the actuating rod 23a is arranged in the sleeve cavity 211a. In addition, the positioning part 25a is engagingly disposed in the positioning hole 213a and the positioning hole 231a to couple the actuating rod 23a in the sleeve cavity 211a.

The handle assembly 300 includes a handle 31, a cover 32 connected with the handle 31, and a connecting element 33 partially arranged in the cover 32. The handle 31 is protruded from a side of the cover 32. The cover 32 has a receiving cavity 322 and a fixing part 321 located in the receiving cavity 322. A first end of the connecting element 33 is rotatably arranged in the receiving cavity 322. The connecting element 33 defines a through hole 331. An end 233a of the actuating rod 23a is fixed in the fixing part 321 after passing through the through hole 331, to connect the handle assembly 300 with the actuator 20a. An outer surface of a second end of the connecting element 33 is provided with a thread 333.

The control plate 30a is arranged in the second cavity 131a of the valve housing 10a and connected with the actuator 20a. The control plate 30a defines a rod cavity 31a used to receive an actuating end 232a of the actuating rod 23a. The control plate 30a includes a plurality of protrusions 33a arranged along a peripheral of the control plate 30a. In addition, the control plate 30a further defines a groove 32a, and the flange 215a is provided with two bulges 217a. When the control plate 30a rotates, the bulge 217a covers or exposes the groove 32a to regulate the water temperature.

The moving plate 40a is connected to the control plate 30a and arranged in the second cavity 131a of the valve housing 10a. When the actuator 20a is actuated, the control plate 30a rotates or slides the actuating plate 40a. The moving plate 40a defines a plurality of receiving grooves 42a arranged along a circumference of the moving plate 40a. The control plate 30a includes a plurality of protrusions 33a arranged along a circumference of the control plate 30a. The protrusions 33a is received in the receiving grooves 42a, to detachably connect the movable plate 40a with the control plate 30a.

The static plate 50a is arranged in the second cavity 131a of the valve housing 10a and adjacent to the moving plate 40a. The static plate 50a defines at least two through holes 51a and at least one through hole 52a. The through hole 51a is communicated with the corresponding through hole 611a and the corresponding through hole 631a, and the through hole 52a is communicated with the corresponding through hole 611a and the corresponding through hole 631a. Specifically, the through holes 51a are communicated with the first extension pipe 500a and the second extension pipe 600a by the corresponding through holes 611a and the corresponding through holes 631a, and the through hole 52a is communicated with the third extension pipe 700a by the corresponding through hole 611a and the corresponding through hole 631a. The moving plate 40a covers the through hole 51a and the through hole 52a, and the moving plate 40a further defines a communicating groove 41a. When the moving plate 40a rotates, the communicating groove 41a can communicate the through hole 52a with the through hole 51a corresponding to the first extension pipe 500a, communicate the through hole 52a with the through hole 51a corresponding to the second extension pipe 600a, or communicate the through hole 52a with the through hole 51a corresponding to the first extension pipe 500a and the through hole 51a corresponding to the second extension pipe 600a, to output hot water, cold water or mixed water. The through hole 51a is arc shaped, a size of the through hole 51a is smaller than that of the through hole 52a, so as to reduce the water flow rate and mix the cold water and hot water completely.

Each sealing member 65a is partially received in one corresponding through hole 631a. A second end 653a of each sealing member 65a protrudes from a second surface of the connecting member 63a and extends towards the static plate 50a. The second end 653a of each sealing member 65a is pressed between the static plate 50a and the connecting member 63a to prevent a leakage. Each second end 653a surrounds the corresponding through hole 51a or the corresponding through hole 52a. Specifically, a size of the through hole 651a is larger than that of the through hole 51a or the through hole 52a, so that the second end 653a can surround the corresponding through hole 51a or the corresponding through hole 52a.

The fluid channel structure 60a is detachably connected to the static plate 50a by a connecting structure, the static plate 50a is located in the second cavity 131a when the fluid channel structure 60a is detachably connected to the valve housing 10a. The connecting structure includes at least one protrusion 634a and at least one fixing groove 53a. In one embodiment, there are a plurality of protrusions 634a, the protrusions 634a may have the same shape or have different shapes, the protrusions 634a are arranged along an outer circumference of the connecting member 63a, and the protrusions 633a surround the protrusions 634a. The protrusions 634a are received in the fixing grooves 53a, respectively. The protrusions 634a surround the through holes 631a. The fixing groove 53a is arranged on the outer side of the static plate 50a.

The protective housing 400 includes a housing 45 and a connecting column 46 substantially perpendicularly connected to the housing 45. The housing 45 defines a via hole 451 and a receiving cavity 452. The connecting column 46 defines a receiving cavity 461 communicated with the via hole 451 and the receiving cavity 452. The fluid channel structure 60a and the valve structure are at least partially accommodated in the receiving cavity 461. An end of the connecting element 33 away from the handle 31 is received in the receiving cavity 461. Specifically, the connecting column 46 includes an internal thread 4611 facing an inner of the receiving cavity 461, the connecting element 33 includes an external thread 333, and the connecting column 42 is threaded with the connecting element 33. The first extension pipe 500a, the second extension pipe 600a, and the third extension pipe 700a are received in the receiving cavity 452 and communicated with the corresponding through holes 611a. One end of the outlet pipe 201 is received in the receiving cavity 452 and communicated with the third extension pipe 700a. The valve core assembly 100a is received in a space formed by the handle assembly 300 and the protective housing 400, that is, the valve core assembly 100a is received in the receiving cavity 452 and the receiving cavity 461. The end of the connecting column 46 away from the handle assembly 300 is provided with a bracket 462 which is used to support the fluid channel structure 60a, and the other end of the connecting element 33 is threaded with the connecting column 46 to mount the fluid channel structure 60a and the valve structure in the receiving cavity 461. The bracket 462 defines a through hole 463 communicated with the receiving cavity 461 and the receiving cavity 452. The base 61a includes a base body 613a and a protruding part 614a projected from the base body 613a. The base body 613a and the protruding part 614a jointly form a step portion 616a, and the step portion 616a is supported by the bracket 462. The bracket 462 disposed in the connecting column 46 mounts the fluid channel structure 60a and the valve structure in the receiving cavity 461 of the connecting column 46 to communicate with the receiving cavity 461.

The base 61a or the bracket 462 defines at least one notch 615a. The notch 615a allows the base 61a to conveniently enter into the receiving cavity 461 through the through hole 463. In one embodiment, the base body 613a or bracket 462 defines two opposite notches 615a. In another embodiment, the base body 613a and the protruding part 614a cooperatively define the notch 615a.

The maximum depth $D_1$ of the notch 615a is about 1-3 mm. For example, the maximum depth $D_1$ of the notch 615a is about 1 mm, 1.5 mm, 2 mm, 2.1 mm, 2.5 mm, or 3 mm.

The vertical distance $D_2$ between the first end wall 6151a and the second end wall 6152a of the notch 615a is about 6-10 mm. For example, the vertical distance $D_2$ between the first end wall 6151a and the second end wall 6152a is about 6 mm, 6.5 mm, 7 mm, 7.5 mm, 8 mm, 8.1 mm, 8.5 mm, 9 mm, 9.5 mm, or 10 mm.

The notch 615a has an arc structure with a radius of about 3-7 mm. For example, the notch 615a has a radius of about 3 mm, 4 mm, 5 mm, 6 mm, 7 mm, or 8 mm.

Figure 26:
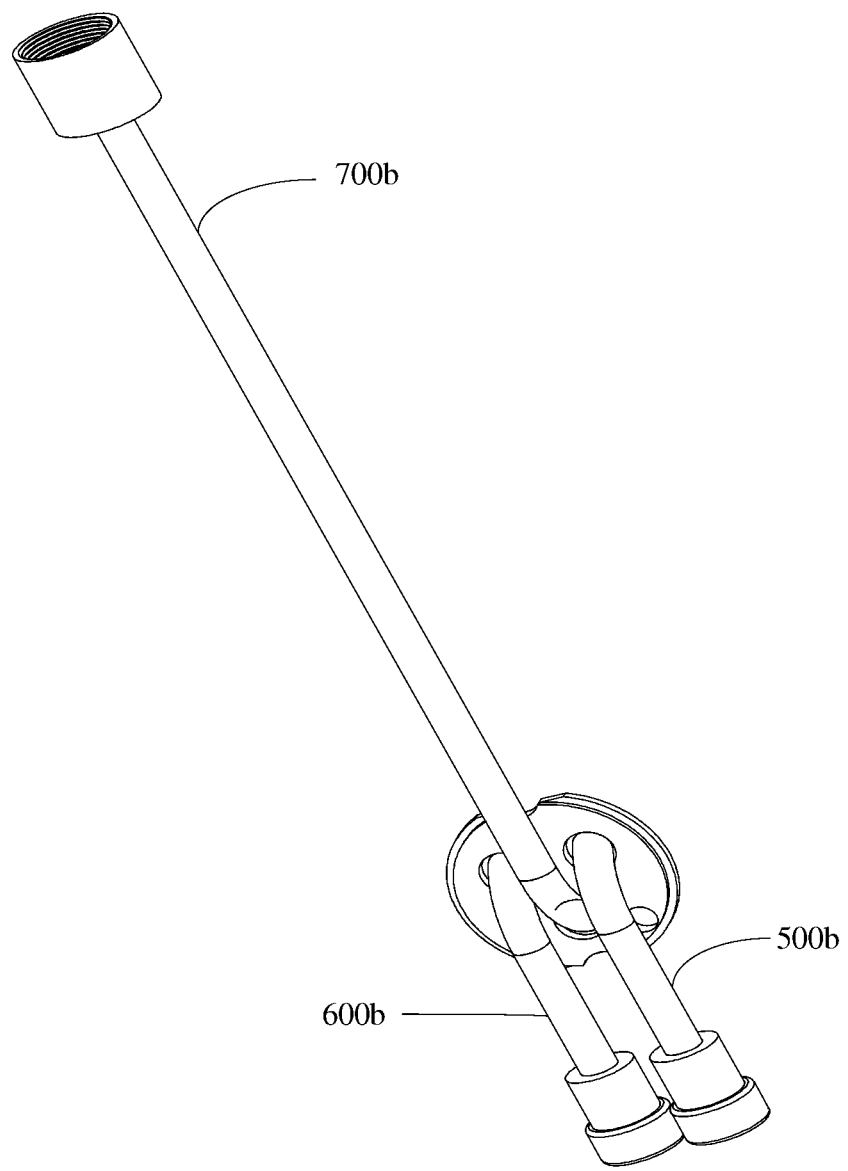
FIG. 26 is a structural diagram of a fluid channel structure according to a second embodiment of the present disclosure.
Figure 27:
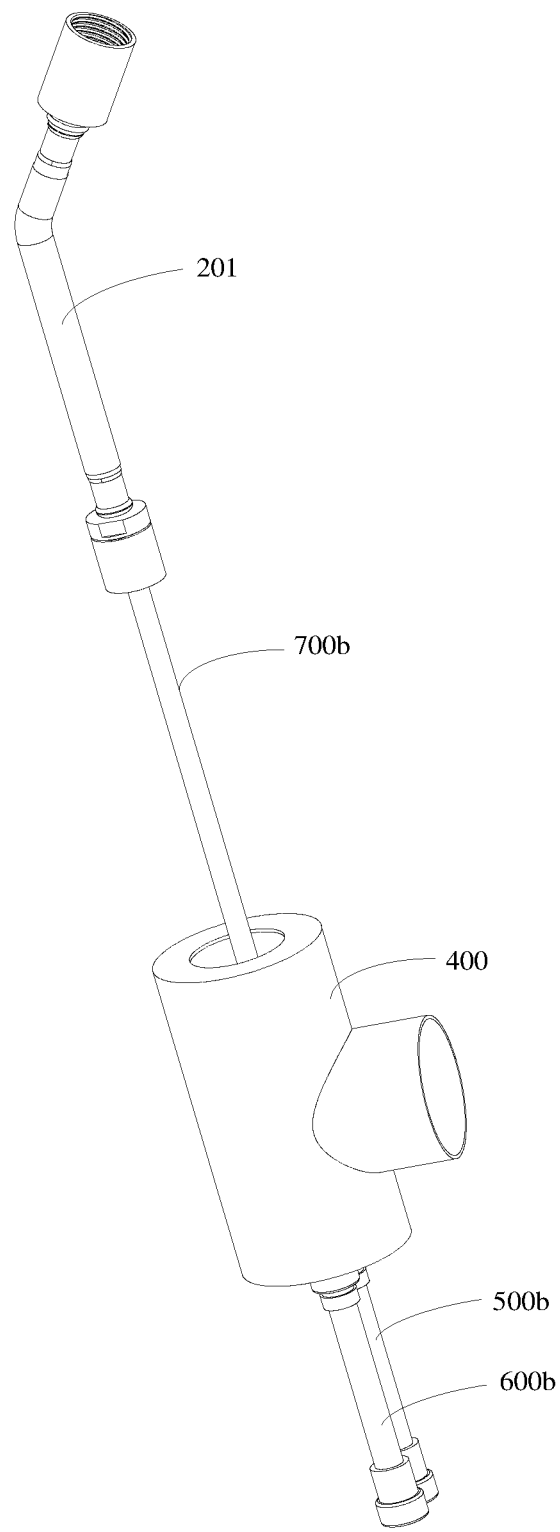
FIG. 27 is a structural diagram of an outlet pipe and the protective housing of the tape and the fluid channel structure shown in FIG. 26.

Please referring to FIGS. 26 to 27. The second embodiment of the present disclosure provides a fluid channel structure 60b. The fluid channel structure 60b is used for non-pulling taps. The fluid channel structure 60b in Example 2 has a similar structure with the fluid channel structure 60a in Example 1. The differences between the two are at least as follows: the free end of the third extension pipe 700b faces upward, that is, back to the ground, and the free end of the first extension pipe 500b and the second extension pipe 600b faces downward, that is, toward the ground.

Please referring to FIGS. 26-27, the present disclosure provides a fluid channel structure 60b according to a second embodiment. The fluid channel structure 60b is applicable to non pull-out tap. The fluid channel structure 60b of the second embodiment has a similar structure with the fluid channel structure 60a of the first embodiment. The differences between the two at least include: the free end of the third extension pipe 700b extends upward, that is, extends away from the ground, and the free ends of the first extension pipe 500b and the second extension pipe 600b extends downward, that is, extends toward the ground.

Figure 28:
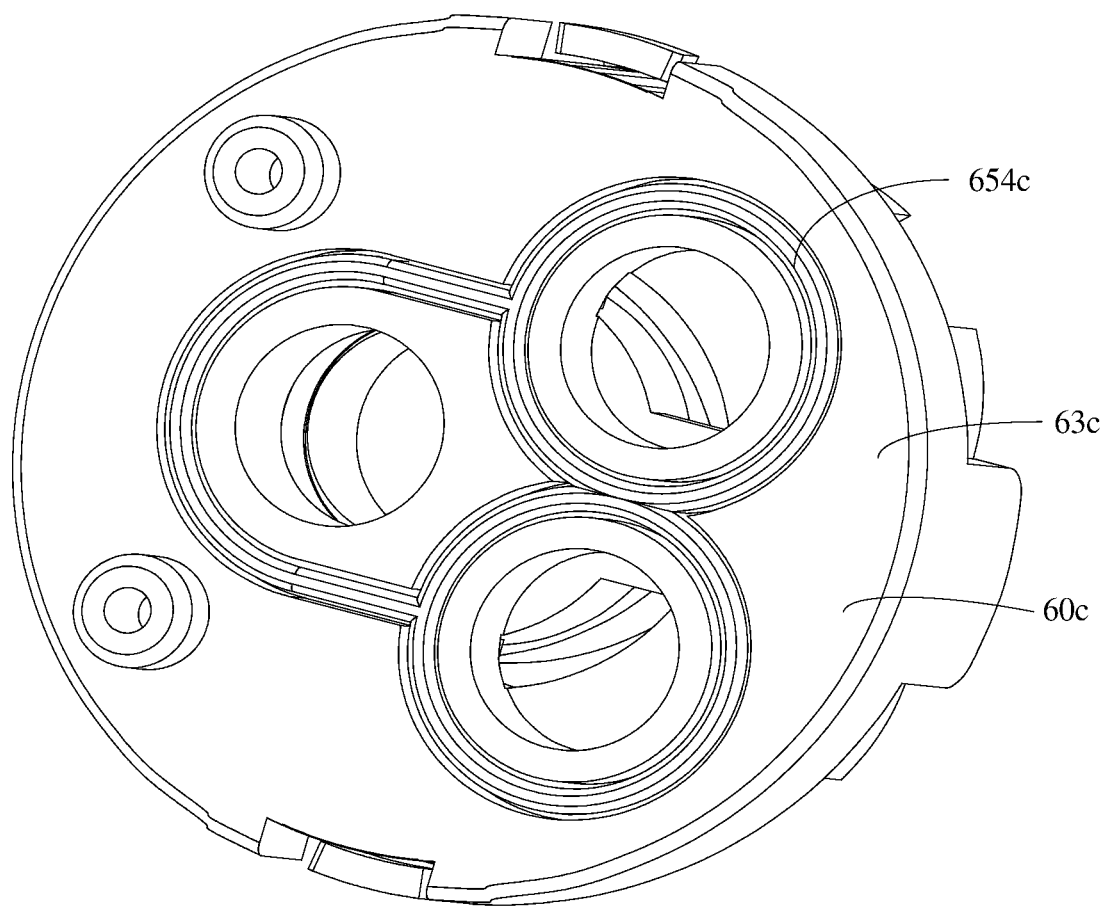
FIG. 28 is a structural diagram of a fluid channel structure according to a third embodiment of the present disclosure.
Figure 29:
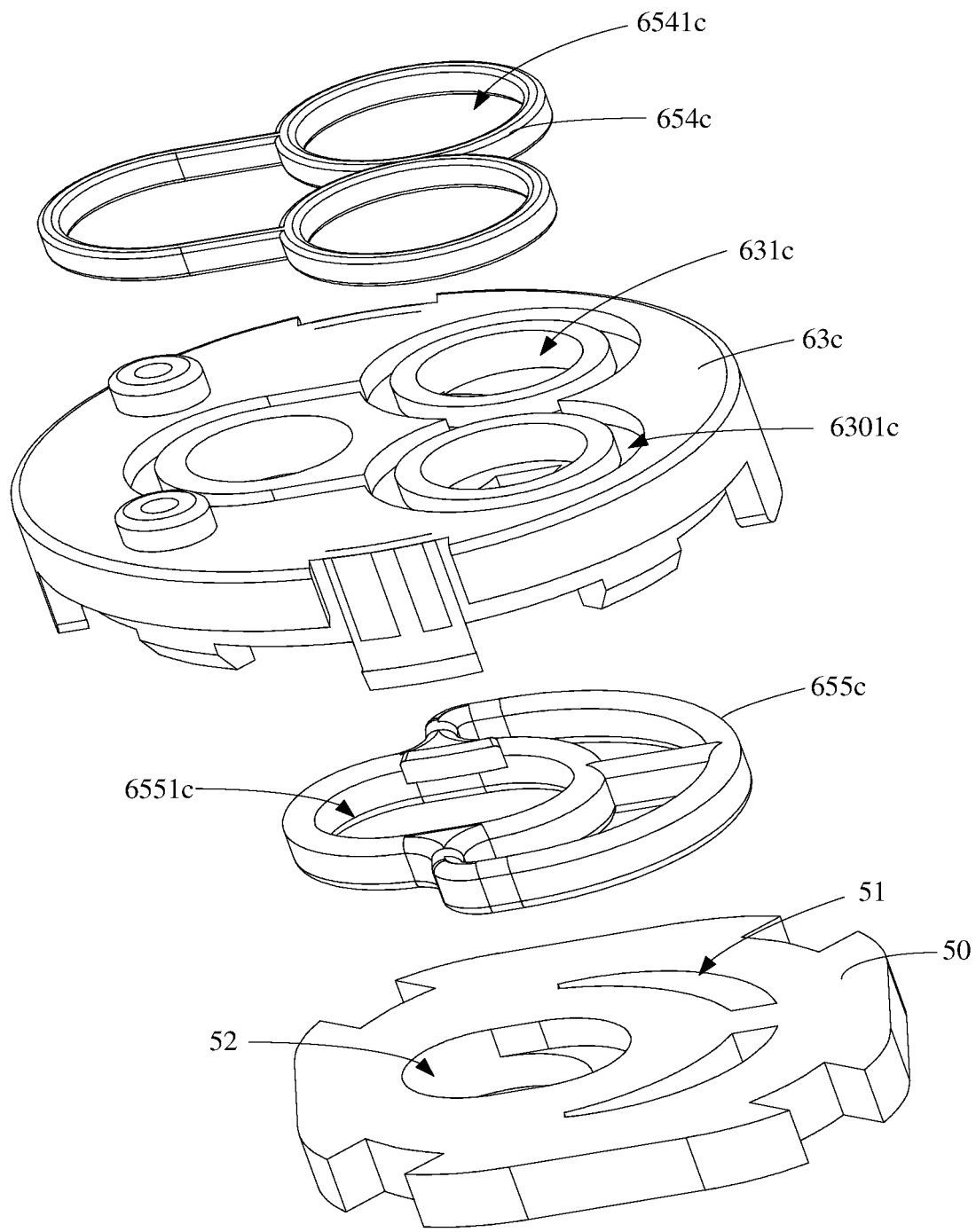
FIG. 29 is an exploded view of sealing rings, the connecting member and the static plate shown in FIG. 28.
Figure 30:
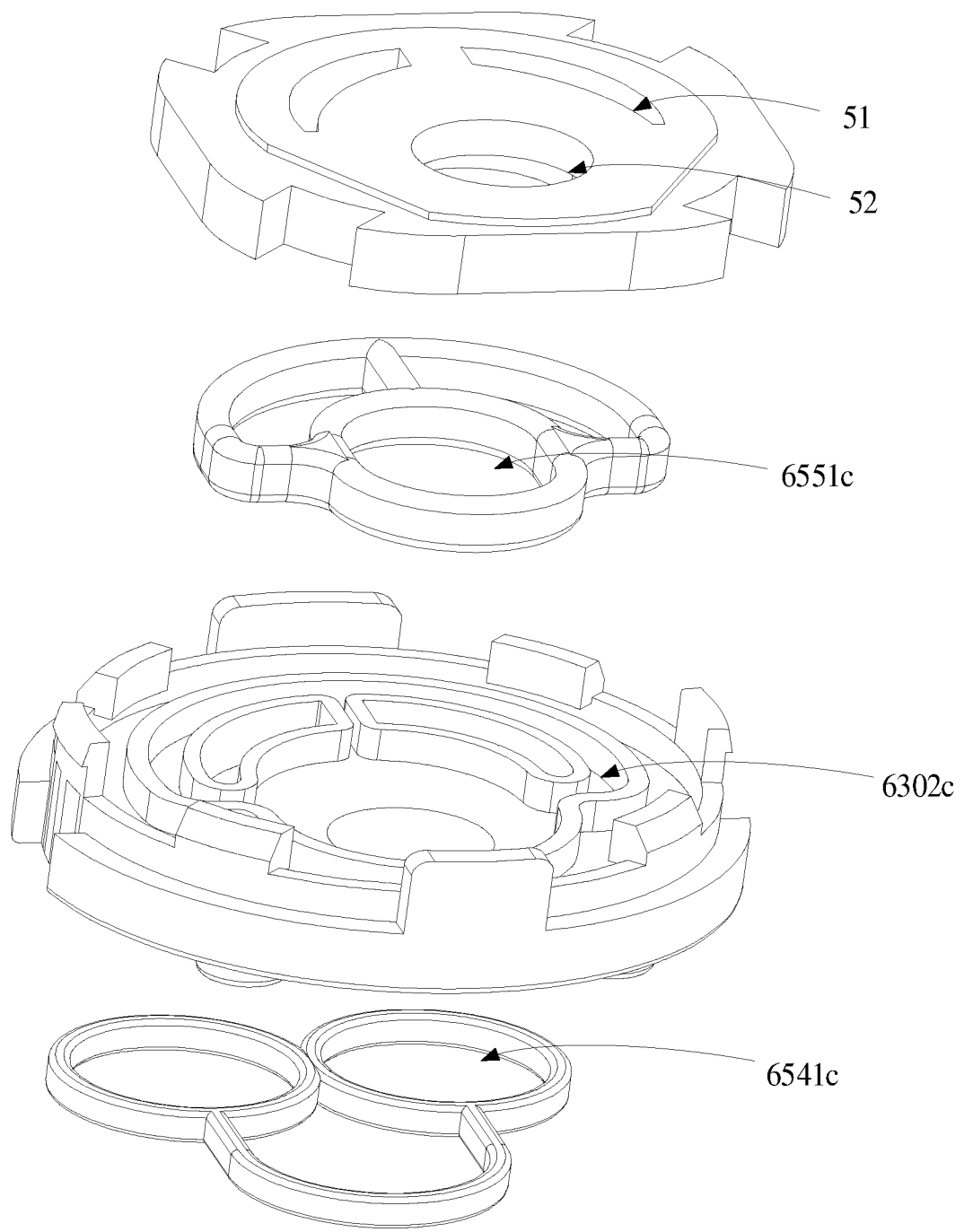
FIG. 30 is another exploded view of the sealing rings, the connecting member and the static plate shown in FIG. 28.

Please referring to FIGS. 28-30, the present disclosure provides a fluid channel structure 60c according to a third embodiment. The fluid channel structure 60c is applicable to pull-out tap or non pull-out tap. The fluid channel structure 60c of the third embodiment has a similar structure with the fluid channel structure 60a of the first embodiment or the fluid channel structure 60b of the second embodiment. The differences between the two at least include: the fluid channel structure 60c includes a first sealing ring 654c and a second sealing ring 655c, the first sealing ring 654c is clamped between the base and the connecting member 63c, and the second sealing ring 655c is clamped between the connecting member 63c and the static plate 50. The first sealing ring 654c defines at least three through holes 6541c, each of the through holes 6541c is communicated with one corresponding through hole 611c and one corresponding through hole 631c. The second sealing ring 655c defines at least three through holes 6551c, each of the through holes 6551c is communicated with one corresponding through hole 631c and one corresponding through hole 51/52. Two sides of the connecting member 63c respectively define a receiving groove 6301c for receiving the first sealing ring 654c and a receiving groove 6302c for receiving the second sealing ring 655c. The receiving groove 6301c and the receiving groove 6302c are arranged around the through holes 631c.

Figure 31:
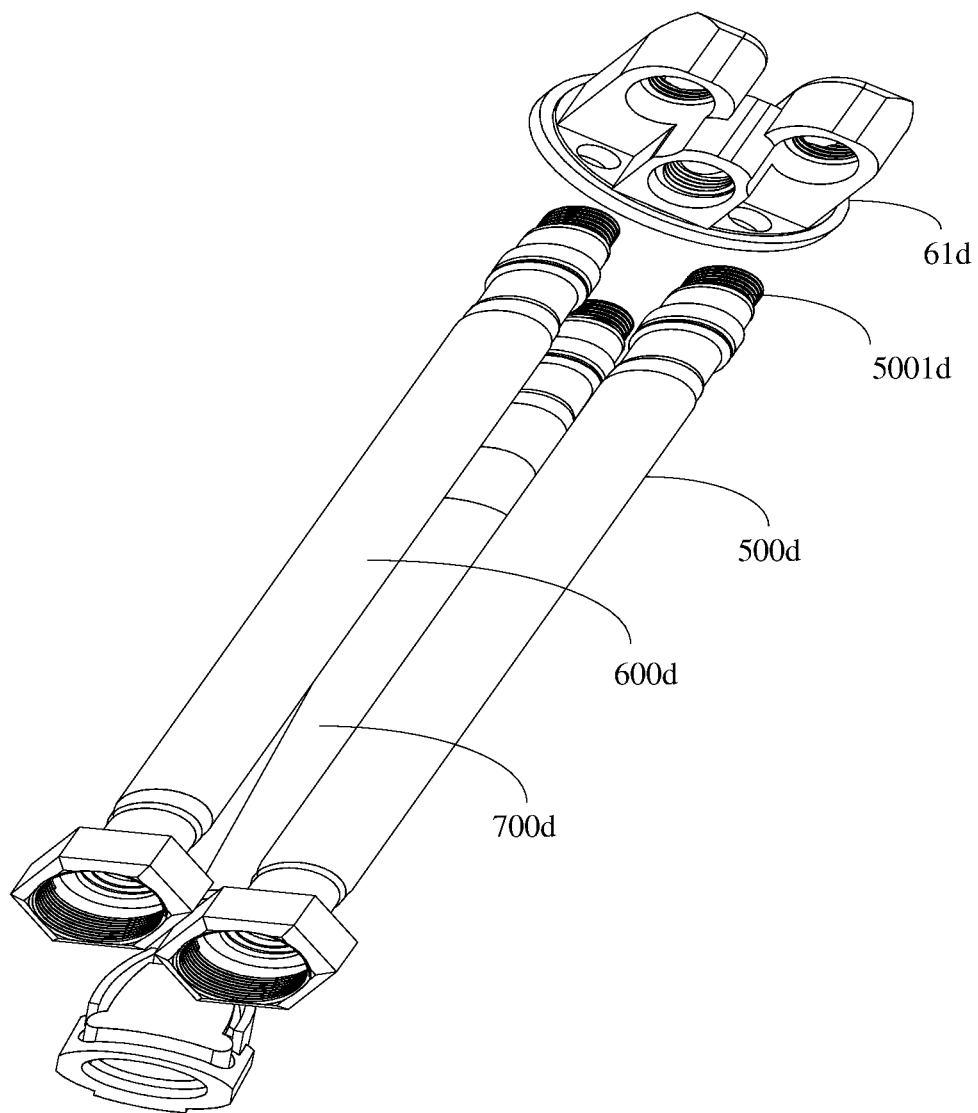
FIG. 31 is a structural diagram of a part of a fluid channel structure according to a fourth embodiment of the present disclosure.
Figure 32:
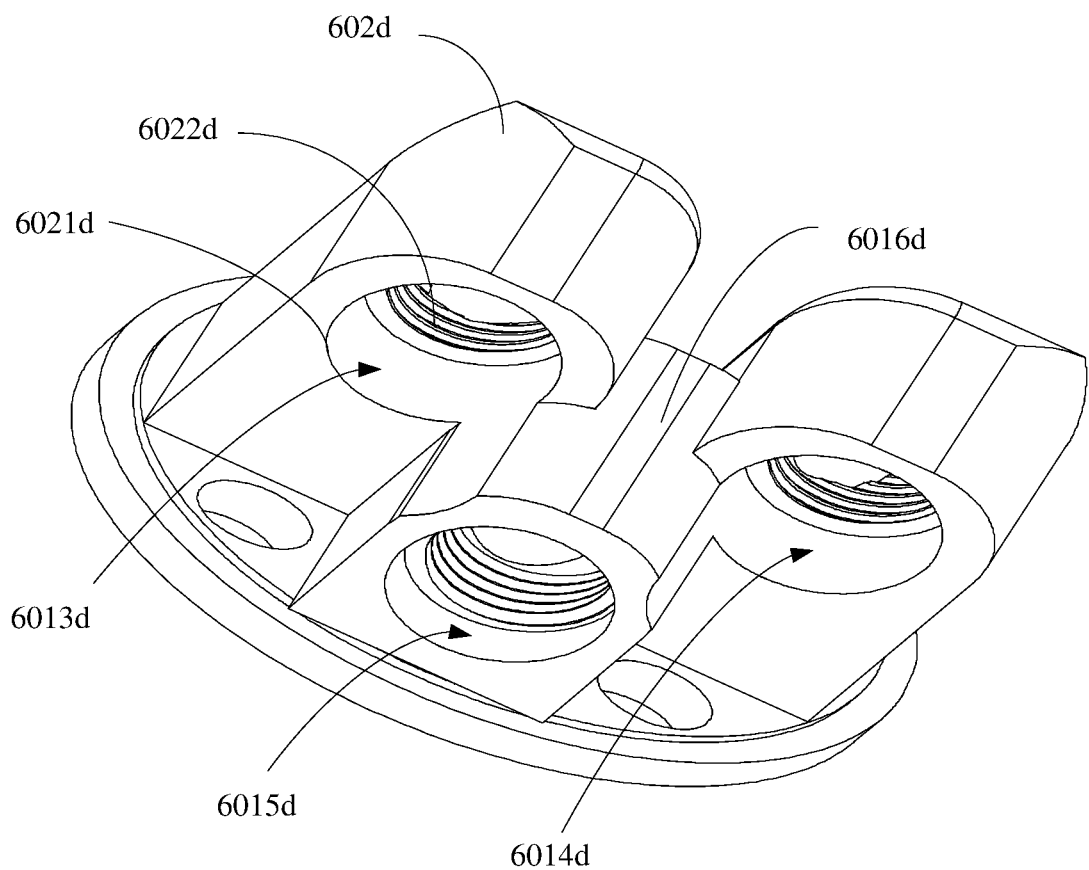
FIG. 32 is a structural diagram of a base shown in FIG. 31.
Figure 33:
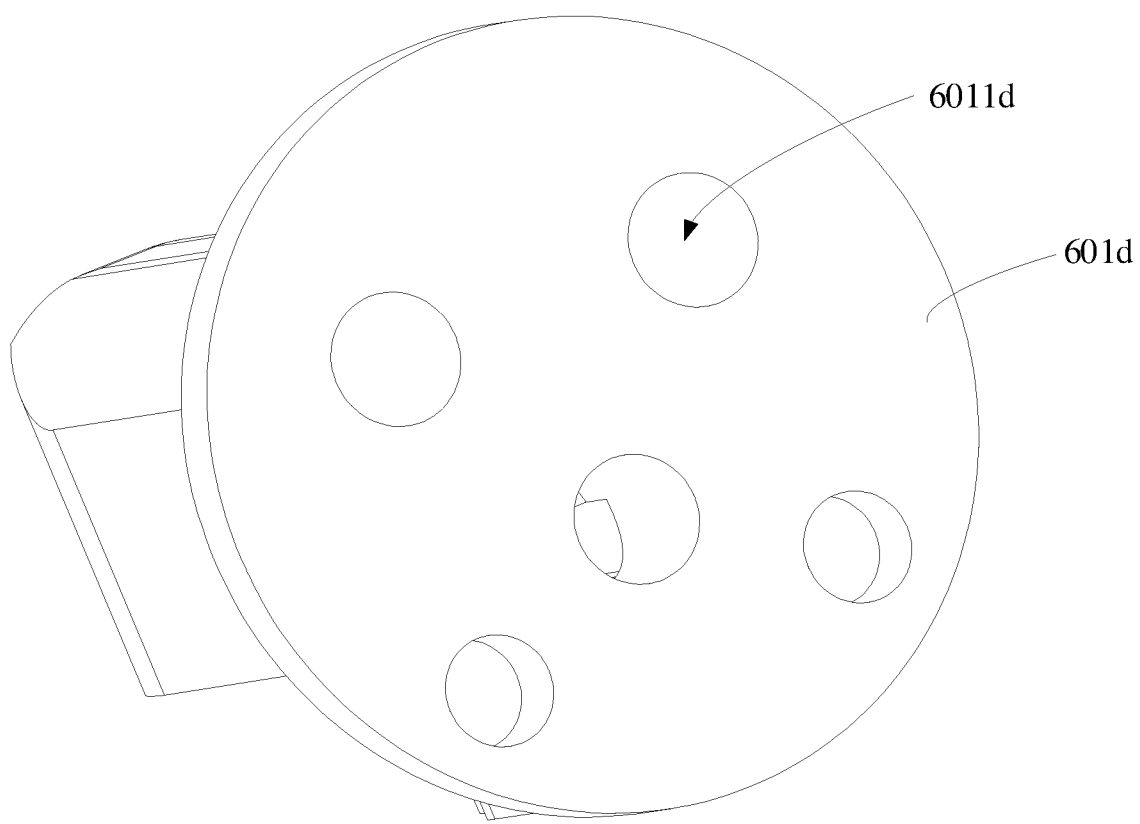
FIG. 33 is another structural diagram of the base shown in FIG. 31.

Please referring to FIGS. 31 to 33, the present disclosure provides a fluid channel structure 60d according to a fourth embodiment. The fluid channel structure 60d is applicable to pull-out tap or non pull-out tap. The fluid channel structure 60d of the fourth embodiment is similar to the fluid channel structure 60a of the first embodiment. The differences between the two at least include: the base 61d includes a first side 601d defining at least three first openings 6011d and the second side 602d defining at least three second openings 6021d; each first opening 6011d is communicated with one corresponding second opening 6021d to form a first inlet channel 6013d, a second inlet channel 6014d, and an outlet channel 6015d; each first opening 6011d is communicated with the corresponding through hole of the connecting member; the outlet channel 6015d is arranged between the first inlet channel 6013d and the second inlet channel 6014d.

The base 61d, the first extension pipe 500d, the second extension pipe 600d, and the third extension pipe 700d can be metal (including stainless steel, copper, and the like) or plastic (the plastic may be rigid plastic or soft plastic). The first extension pipe 500d, the second extension pipe 600d, and the third extension pipe 700d is connected with the base 61a in a welding mode or a threaded connection mode. In a specific embodiment, the first extension pipe 500d, the second extension pipe 600d, and the third extension pipe 700d all have an external thread 5001d, and the base 61d has an internal thread 6022d. Preferably, the body of each of the first extension pipe 500d, the second extension pipe 600d and the third extension pipe 700*d* are made of flexible materials including flexible plastic, woven materials, silica gel, or rubber.

In one embodiment, the first inlet channel 6013*d*, the second inlet channel 6014*d* and the outlet channel 6015*d* are integratedly formed by injection molding. In another embodiment, the first inlet channel 6013*d*, the second inlet channel 6014*d* and the outlet channel 6015*d* are independent structures.

The first opening 6011*d* corresponding to the outlet channel 6015*d* is protruded from the other first opening 6011*d*. In one embodiment, the first opening 6011*d* corresponding to the outlet channel 6015*d* and the outlet channel 6015*d* are protruded outwards from a plane of the first side 601*d*, thus forming a hill and valley pattern between the first inlet channel 6013*d* and the second inlet channel 6014*d*.

The outlet channel 6015*d* is arranged below in a level with respect to the first inlet channel 6013*d* and the second inlet channel 6014*d*, thereby forming a depression 6016*d* between the first inlet channel 6013*d* and the third inlet channel 6014*d*.

In one embodiment, the first opening 6011*d* corresponding to the outlet channel 6015*d* and other first openings 6011*d* are configured to face towards a same direction. In another embodiment, the first opening 6011*d* corresponding to the outlet channel 6015*d* and other first openings 6011*d* are configured to face towards different directions.

Figure 34:
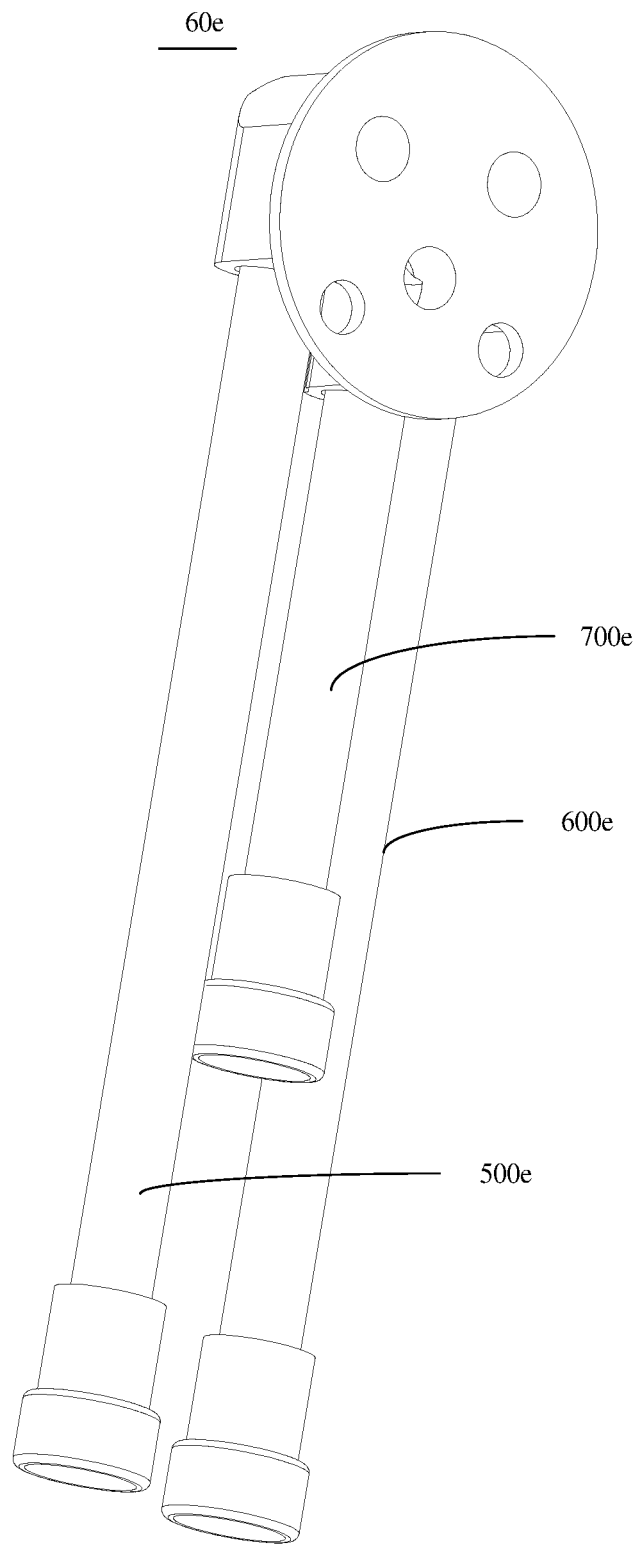
FIG. 34 is a structural diagram of a part of a fluid channel structure according to a fifth embodiment of the present disclosure.

Please referring to FIG. 34, the present disclosure provides a fluid channel structure 60*e* according to a fifth embodiment. The fluid channel structure 60*e* is applicable to a pull-out tap or a non pull-out tap. The fluid channel structure 60*e* of the fifth embodiment is similar to the fluid channel structure 60*d* of the fourth embodiment in structure. The difference between the two at least includes: the length of the third extension pipe 700*e* is less than that of the first extension pipe 500*e* or the second extension pipe 600*e*.

The length of the third extension pipe 700*e* may be about 10-30 cm, for example, the length of the third extension pipe 700*e* is 10 mm, 15 mm, 20 mm, 25 mm, or 30 mm. The length of the first extension pipe 500*e* or the second extension pipe 600*e* may be about 15-40 cm, for example, the length of the first extension pipe 500*e* or the second extension pipe 600*e* is 10 mm, 15 mm, 20 mm, 25 mm, 30 mm, 35 mm, or 40 mm.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching.

What is claimed is:

1. A fluid channel structure, applied to a tap comprising a protective housing, wherein the protective housing comprises a housing and a connecting column connected to the housing; the connecting column defines a first receiving cavity, the housing defines a second receiving cavity, and a positioning part is arranged at an end of the connecting column and is located inside the second receiving cavity; the positioning part defines a via hole, the first receiving cavity and the second receiving cavity are communicated with each other via the via hole, the first receiving cavity is extending along a first direction, the second receiving cavity is extending along a second direction intersected with the first direction; wherein the fluid channel structure comprises:
a base, received in the first receiving cavity and mounted on the positioning part; wherein the base defines at least three through holes for water flow;
a first extension pipe, a second extension pipe, and a third extension pipe, wherein, the first extension pipe, the second extension pipe, and the third extension pipe are extending in the second receiving cavity; an end of the first extension pipe, an end of the second extension pipe, and an end of the third extension pipe are respectively directly threaded to the at least three through holes.

2. The fluid channel structure according to claim 1, wherein one of the base and the positioning part defines at least one notch, the base passes through the via hole and enters into the first receiving cavity by the notch.

3. The fluid channel structure according to claim 2, wherein
a maximum depth of the notch is about 1-3 mm; or
the notch has an arc structure with a radius of about 3-7 mm; or
a vertical distance between a first end wall and a second end wall of the notch is about 6-10 mm.

4. A tap, comprising:
a valve core assembly, comprising
a fluid channel structure as recited in claim 1; and
a valve structure, connected with the fluid channel structure and configured to open and close the fluid channel structure;
wherein one of the base and the positioning part defines at least one notch, the base passes through the via hole and enters into the first receiving cavity by the notch; the base is arranged with a step portion, and the step portion is supported by the positioning part and is received in the first receiving cavity defined inside the positioning part.

5. The tap according to claim 4, wherein
a maximum depth of the notch is about 1-3 mm; or
the notch has an arc structure with a radius of about 3-7 mm; or
a vertical distance between a first end wall and a second end wall of the notch is about 6-10 mm.

6. The tap according to claim 4, wherein
the first extension pipe, the second extension pipe and the third extension pipe approximately extend along an axial direction of the protective housing, one end of each of the first extension pipe, the second extension pipe and the third extension pipe is connected with the base, another end of each of the first extension pipe, the second extension pipe and the third extension pipe comprises a threaded portion; wherein at least a portion of the first extension pipe, at least a portion of the second extension pipe; and at least a portion of the third extension pipe are arranged inside the second receiving cavity;
wherein, a thickness of the base is about 1-3 mm; or
a diameter of the first extension pipe is about 0.6-2 cm; or
a length of the first extension pipe is about 10~30 cm; or
a diameter of the second extension pipe is about 0.6-2 cm; or
a length of the second extension pipe is about 10~30 cm; or
a diameter of the third extension pipe is about 0.6-2 cm; or
a length of the third extension pipe is about 15-40 cm; or
a length of the third extension pipe is greater than that of the first extension pipe or the second extension pipe; or
a length of the third extension pipe is smaller than that of the first extension pipe or the second extension pipe.

7. The tap according to claim 4, wherein
the first extension pipe, the second extension pipe and the third extension pipe approximately extend along an axial direction of the protective housing, one end of each of the first extension pipe, the second extension pipe and the third extension pipe is connected with the base, another end of each of the first extension pipe, the second extension pipe and the third extension pipe comprises a threaded portion; wherein at least a portion of the first extension pipe, at least a portion of the second extension pipe; and at least a portion of the third extension pipe are arranged inside the second receiving cavity;
wherein free ends of the first extension pipe, the second extension pipe and the third extension pipe comprises the threaded portion; or
the first extension pipe, the second extension pipe and the third extension pipe are welded or threaded with the base; or
the third extension pipe and the first extension pipe face towards the same direction or different direction; or
the third extension pipe and the second extension pipe face towards the same direction or different direction; or
the first extension pipe, the second extension pipe, the third extension pipe and the base are made of metal or rigid plastic, or a main body of each of the first extension pipe, the second extension pipe and the third extension pipe is made of flexible material.

8. The tap according to claim 7, wherein the base has a plate structure, the base defines at least three first through holes, and the first extension pipe, the second extension pipe and the third extension pipe are communicated with the first through holes, respectively.

9. The tap according to claim 8, further comprising:
a connecting member, defining at least three second through holes; and
a sealing member, arranged between the base and the connecting member, wherein,
a quantity of the sealing member is at least three, each sealing member defines a third through hole, and each third through hole is communicated with one corresponding first through hole and one corresponding second through hole; or
the sealing member defines at least three fourth through holes, each of the fourth through holes is communicated with one corresponding first through hole and one corresponding second through hole.

10. The tap according to claim 4, wherein the base defining at least three first openings and at least three second openings, the first openings are respectively communicated with the second openings to form a first inlet channel, a second inlet channel, and an outlet channel, the first extension pipe, the second extension pipe, and the third extension pipe are communicated with the first openings, respectively.

11. The tap according to claim 10, further comprising:
a connecting member, defining at least three fifth through holes; and
a sealing member, arranged between the base and the connecting member, wherein,
a quantity of the sealing member is at least three, each sealing member defines a sixth through hole, and each sixth through hole is communicated with one corresponding first through hole and one corresponding second through hole; or
the sealing member defines at least three seventh through holes, each of the seventh through holes is communicated with one corresponding first through hole and one corresponding second through hole.

12. The fluid channel structure according to claim 1, wherein the first extension pipe, the second extension pipe and the third extension pipe approximately extend along an axial direction of the protective housing, another end of each of the first extension pipe, the second extension pipe and the third extension pipe comprises a threaded portion; wherein at least a portion of the first extension pipe, at least a portion of the second extension pipe; and at least a portion of the third extension pipe are arranged inside the second receiving cavity.

13. The fluid channel structure according to claim 12, wherein
a thickness of the base is about 1-3 mm; or
a diameter of the first extension pipe is about 0.6-2 cm; or
a length of the first extension pipe is about 10~30 cm; or
a diameter of the second extension pipe is about 0.6-2 cm; or
a length of the second extension pipe is about 10~30 cm; or
a diameter of the third extension pipe is about 0.6-2 cm; or
a length of the third extension pipe is about 15-40 cm; or
a length of the third extension pipe is greater than that of the first extension pipe or the second extension pipe; or
a length of the third extension pipe is smaller than that of the first extension pipe or the second extension pipe.

14. The fluid channel structure according to claim 12, wherein
free ends of the first extension pipe, the second extension pipe and the third extension pipe comprises the threaded portion; or
the first extension pipe, the second extension pipe and the third extension pipe are welded or threaded with the base; or
the third extension pipe and the first extension pipe face towards the same direction or different direction; or
the third extension pipe and the second extension pipe face towards the same direction or different direction; or
the first extension pipe, the second extension pipe, the third extension pipe and the base are made of metal or rigid plastic, or a main body of each of the first extension pipe, the second extension pipe and the third extension pipe is made of flexible material.

15. The fluid channel structure according to claim 12, wherein the base has a plate structure, and the first extension pipe, the second extension pipe and the third extension pipe are communicated with the first through holes, respectively.

16. The fluid channel structure according to claim 15, further comprising:
a connecting member, defining at least three second through holes; and
a sealing member, arranged between the base and the connecting member, wherein,
a quantity of the sealing member is at least three, each sealing member defines a third through hole, and each third through hole is communicated with one corresponding first through hole and one corresponding second through hole; or
the sealing member defines at least three fourth through holes, each of the fourth through holes is communicated with one corresponding first through hole and one corresponding second through hole.

17. The fluid channel structure according to claim 12, wherein the base defining at least three first openings and at least three second openings, the first openings are respectively communicated with the second openings to form a first inlet channel, a second inlet channel and an outlet channel, the first extension pipe, the second extension pipe and the third extension pipe are communicated with the first openings, respectively.

18. The fluid channel structure according to claim 17, further comprising:
- a connecting member, defining at least three fifth through holes; and
- a sealing member, arranged between the base and the connecting member, wherein,
- a quantity of the sealing member is at least three, each sealing member defines a sixth through hole, and each sixth through hole is communicated with one corresponding first through hole and one corresponding second through hole; or
- the sealing member defines at least three seventh through holes, each of the seventh through holes is communicated with one corresponding first through hole and one corresponding second through hole.

19. A tap, comprising a protective housing, a valve structure and a fluid channel structure, the protective housing comprises a housing and a connecting column connected to the housing; the connecting column defines a receiving cavity and is arranged with a positioning part at an end of the connecting column, the positioning part defines a via hole communicated with the receiving cavity, wherein the positioning part mounts the fluid channel structure and the valve structure in the receiving cavity, wherein the fluid channel structure comprises:
- a base, defining at least three first openings and at least three second openings, each of the at least three first openings is communicated to one corresponding second opening to form a first inlet channel, a second inlet channel and an outlet channel; and
- a connecting member, defining at least three through holes, the at least three through holes are in one-to-one correspondence with the at least three first openings and communicated to corresponding second openings;
- a first extension pipe, a second extension pipe, and a third extension pipe, wherein, the first extension pipe, the second extension pipe, and the third extension pipe are extending inside the housing; an end of the first extension pipe, an end of the second extension pipe, and an end of the third extension pipe are respectively directly threaded to the at least three second openings;
- wherein one of the base and the positioning part defines at least one notch, the base passes through the via hole and enters into the first receiving cavity by the notch; the base is arranged with a step portion, and the step portion is supported by the positioning part and is received in the first receiving cavity defined inside the positioning part.

* * * * *